US012681806B2

(12) United States Patent
Shah

(10) Patent No.: US 12,681,806 B2
(45) Date of Patent: *Jul. 14, 2026

(54) METHOD TO RESET CONFIGURABLE UNITS IN A RECONFIGURABLE PROCESSOR

(71) Applicant: SambaNova Systems, Inc., Palo Alto, CA (US)

(72) Inventor: Manish K Shah, Austin, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/788,391

(22) Filed: Jul. 30, 2024

(65) Prior Publication Data

US 2024/0385929 A1     Nov. 21, 2024

Related U.S. Application Data

(63) Continuation of application No. 17/974,496, filed on Oct. 26, 2022, now Pat. No. 12,073,231.

(Continued)

(51) Int. Cl.
*G06F 15/80* (2006.01)
*G06F 1/24* (2006.01)
(Continued)

(52) U.S. Cl.
CPC ............ *G06F 11/1441* (2013.01); *G06F 1/24* (2013.01); *G06F 9/442* (2013.01); *G06F 9/485* (2013.01);
(Continued)

(58) Field of Classification Search
CPC ........ G06F 11/1441; G06F 1/24; G06F 9/442; G06F 9/485; G06F 15/16; G06F 15/80; G06F 15/7867; G06F 15/825
See application file for complete search history.

(56) References Cited

U.S. PATENT DOCUMENTS 5,251,227 A    10/1993   Bruckert et al.
6,973,590 B1   12/2005   Russ et al.
(Continued)

OTHER PUBLICATIONS

D. Wentzlaff et al., "On-Chip Interconnection Architecture of the Tile Processor," Sep.-Oct. 2007, IEEE Micro, vol. 27, No. 5, p. 15-31 (Year: 2007).

(Continued)

*Primary Examiner* — Corey S Faherty
(74) *Attorney, Agent, or Firm* — FP Patents; Sikander M. Khan; Bruce A. Young

(57) ABSTRACT

Disclosed is a method for resetting configurable units in a reconfigurable processor with an array of configurable units and a force-quit controller on an integrated circuit substrate. The array includes multiple sub-arrays of configurable units. The method involves receiving a force-quit command at the force-quit controller and generating force-quit control signals to reset configurable units in a specific sub-array of the plurality of sub-arrays. The specific sub-array contains the force-quit controller. This method enhances the efficiency and reliability of reconfigurable processors by enabling targeted and controlled resets of configurable units within the reconfigurable processor architecture.

20 Claims, 17 Drawing Sheets

Figure 3A

Related U.S. Application Data

(60) Provisional application No. 63/272,557, filed on Oct. 27, 2021.

(51) Int. Cl.

| | |
|---|---|
| *G06F 9/4401* | (2018.01) |
| *G06F 9/48* | (2006.01) |
| *G06F 11/14* | (2006.01) |
| *G06F 15/16* | (2006.01) |
| *G06F 15/78* | (2006.01) |
| *G06F 15/82* | (2006.01) |

(52) U.S. Cl.
CPC .............. *G06F 15/16* (2013.01); *G06F 15/80* (2013.01); *G06F 15/7867* (2013.01); *G06F 15/825* (2013.01)

(56) References Cited

U.S. PATENT DOCUMENTS

| | | | |
|---|---|---|---|
| 10,698,853 | B1 | 6/2020 | Grohoski et al. |
| 10,768,899 | B2 | 9/2020 | Koeplinger et al. |
| 10,831,507 | B2 | 11/2020 | Shah et al. |
| 11,055,141 | B2 | 7/2021 | Prabhakar et al. |
| 11,080,227 | B2 | 8/2021 | Koeplinger et al. |
| 11,150,872 | B2 | 10/2021 | Wang et al. |
| 11,182,221 | B1 | 11/2021 | Sivaramakrishnan et al. |
| 11,182,264 | B1 | 11/2021 | Sivaramakrishnan et al. |
| 11,188,497 | B2 | 11/2021 | Shah et al. |
| 11,237,880 | B1 | 2/2022 | Raumann et al. |
| 11,237,971 | B1 | 2/2022 | Brown et al. |
| 11,250,105 | B2 | 2/2022 | Wang et al. |
| 11,327,713 | B2 | 5/2022 | Wang et al. |
| 11,327,717 | B2 | 5/2022 | Wang et al. |
| 11,327,923 | B2 | 5/2022 | Wang et al. |
| 11,328,038 | B2 | 5/2022 | Wang et al. |
| 11,386,038 | B2 | 7/2022 | Prabhakar et al. |
| 11,410,027 | B2 | 8/2022 | Chen et al. |
| 11,645,057 | B2 | 5/2023 | Koeplinger et al. |
| 11,709,664 | B2 | 7/2023 | Chen et al. |
| 11,782,729 | B2 | 10/2023 | Grohoski et al. |
| 11,809,908 | B2 | 11/2023 | Kumar et al. |
| 11,836,629 | B2 | 12/2023 | Liu |
| 2014/0013331 | A1 | 1/2014 | Noro |
| 2018/0308209 | A1 | 10/2018 | Ramadoss et al. |
| 2018/0314522 | A1 | 11/2018 | Giroux et al. |
| 2019/0317770 | A1* | 10/2019 | Sankaralingam ..... G06F 15/825 |
| 2020/0004721 | A1 | 1/2020 | Letey et al. |
| 2021/0081691 | A1 | 3/2021 | Chen et al. |
| 2021/0109813 | A1 | 4/2021 | Morris et al. |
| 2021/0183412 | A1 | 6/2021 | Pulipati et al. |
| 2023/0125149 | A1 | 4/2023 | Shah |
| 2023/0127793 | A1 | 4/2023 | Shah |

OTHER PUBLICATIONS

Koeplinger et al., Spatial: A Language and Compiler for Application Accelerators, PLDI '18, Jun. 18-22, 2018, Association for Computng Machinery, 16 pages.

Prabhakar et al., Plasticine: A Reconfigurable Architecture for Parallel Patterns, ISCA, Jun. 24-28, 2017, 14 pages.

U.S. Appl. No. 17/974,496—Notice of Allowance, dated Apr. 17, 2024, 7 pages.

* cited by examiner

Figure 7:
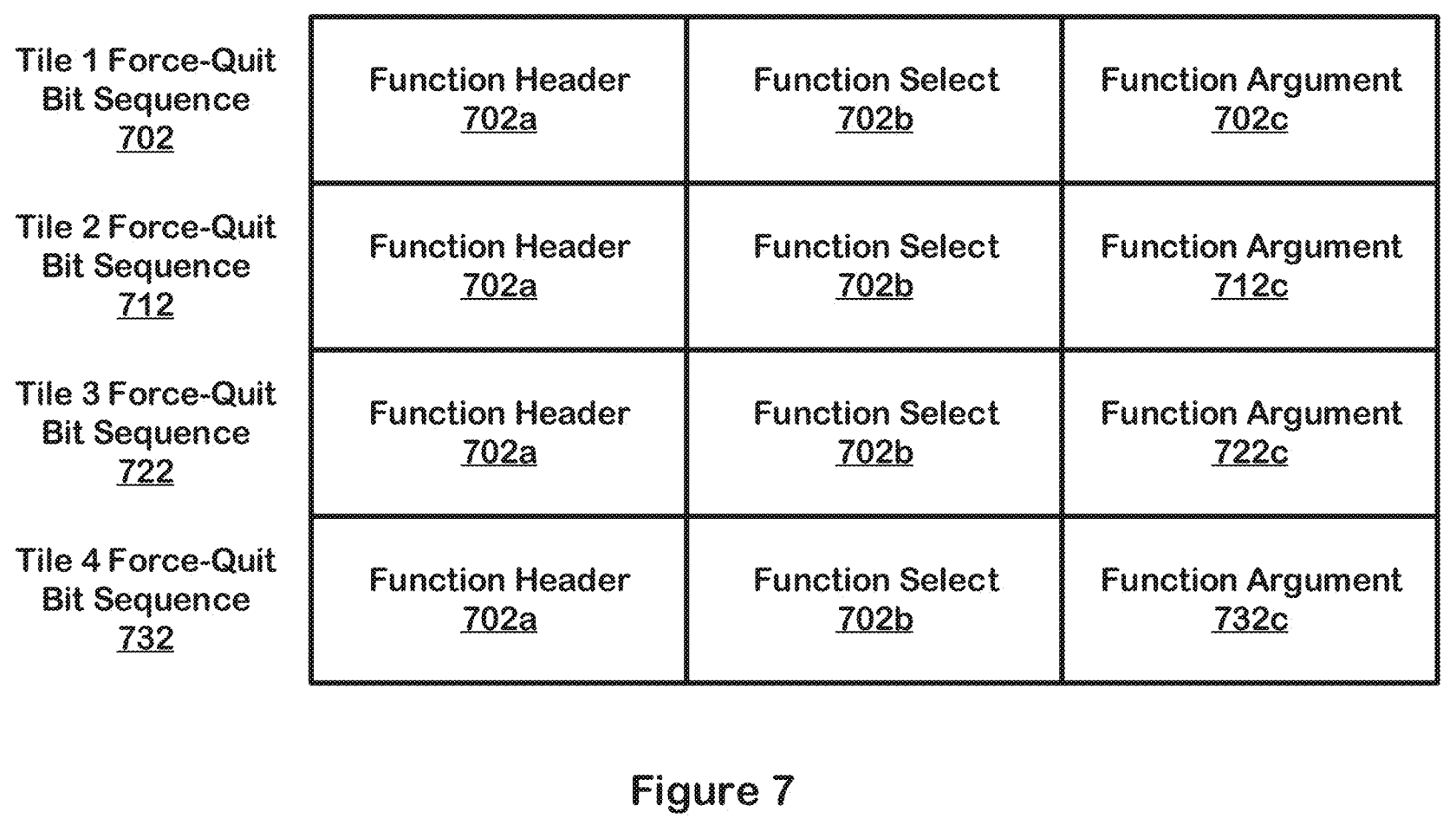

| | | |
|---|---|---|
| Function Header 702a | Function Select 702b | Function Argument 702c |
| Function Header 702a | Function Select 702b | Function Argument 712c |
| Function Header 702a | Function Select 702b | Function Argument 722c |
| Function Header 702a | Function Select 702b | Function Argument 732c |

Tile 1 Force-Quit Bit Sequence 702

Tile 2 Force-Quit Bit Sequence 712

Tile 3 Force-Quit Bit Sequence 722

Tile 4 Force-Quit Bit Sequence 732

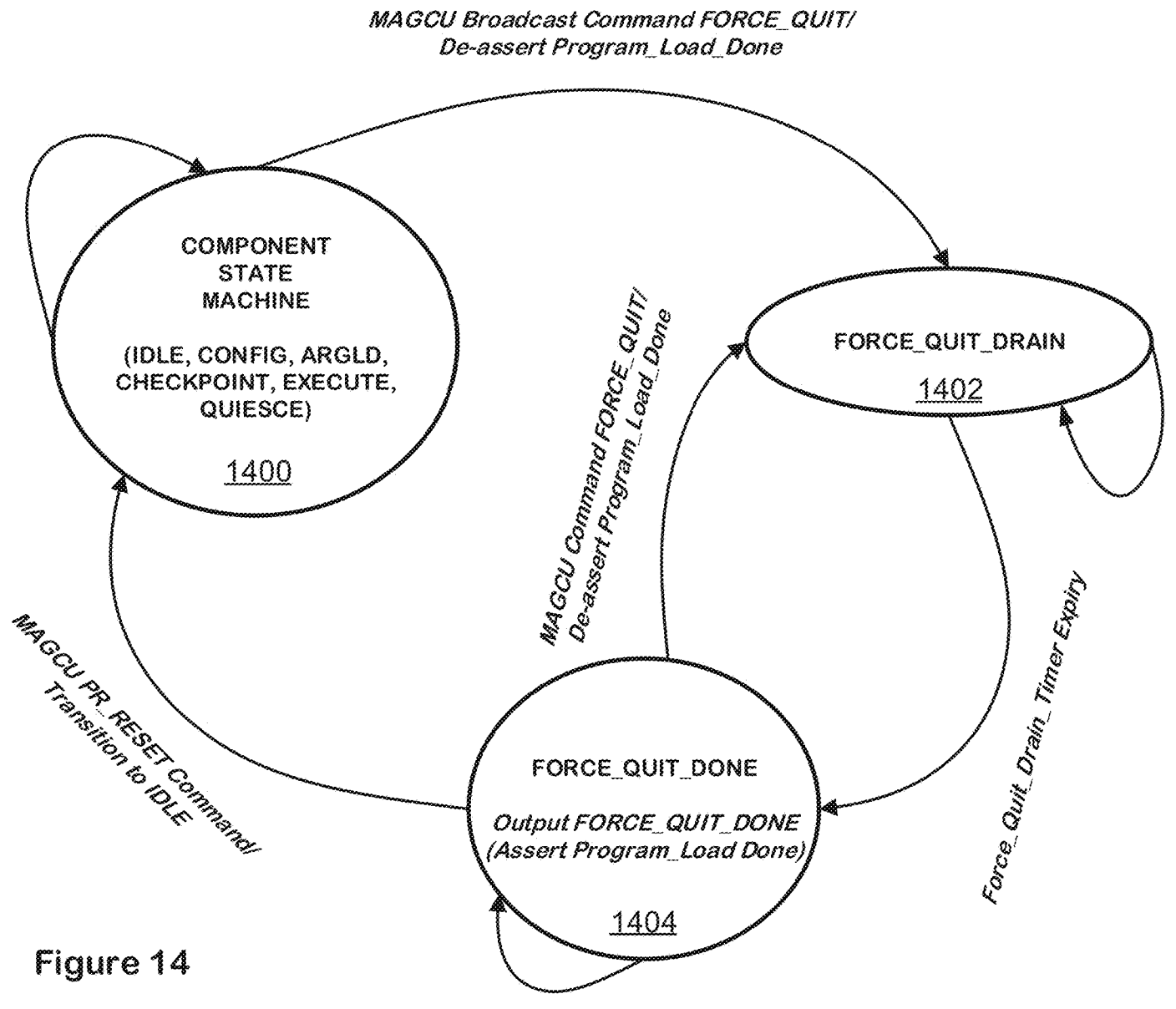

FORCE_QUIT_DRAIN
1402

FORCE_QUIT_DONE
Output FORCE_QUIT_DONE
(Assert Program_Load Done)
1404

COMPONENT
STATE
MACHINE (IDLE, CONFIG, ARGLD,
CHECKPOINT, EXECUTE,
QUIESCE)
1400

Force_Quit_Drain_Timer Expiry

MAGCU Command FORCE_QUIT/
De-assert Program_Load_Done

MAGCU Broadcast Command FORCE_QUIT/
De-assert Program_Load_Done

MAGCU PR_RESET Command/
Transition to IDLE

Figure 14

Force_Quit_Timeout Register Bits

| Bits | Field | Description |
|---|---|---|
| A:0 | Timeout Value | Number of cycles MAGCU waits before signaling Force-Quit Done (Minimum *K* cycles) |
| A+1 | Force-Quit Disable | Disables Force-Quit Feature |

Figure 15

Tile Status Register Bits

| Bits | Field | Description |
|---|---|---|
| X | Force_Quit_Complete | Set when Force Quit is complete |
| Y | Force_Quit_Component_Status | Set if all Tile components successfully complete Force-Quit |
| N:M | Program State | Reflects the state of the following Master AGCU state machines:<br><br>– Wait for Force Quit to complete<br>– Force Quit Done |

Figure 16

Quiesce Control Register Bit

| Bits | Field | Description |
|---|---|---|
| Z | FORCE_QUIT_IDLE | Transition from FORCE_QUIT_DONE state to IDLE state |

Figure 17

METHOD TO RESET CONFIGURABLE UNITS IN A RECONFIGURABLE PROCESSOR

PRIORITY DATA

This application is a continuation of U.S. patent application No. 17/974,496 entitled "FRACTIONAL FORCE-QUIT FOR RECONFIGURABLE PROCESSORS" filed Oct. 26, 2022, which claims the benefit of U.S. Provisional patent application Ser. No. 63/272,557, filed on Oct. 27, 2021, titled, "FORCE-QUIT OF RECONFIGURABLE PROCESSOR," both of which are hereby incorporated by reference for all purposes. This application is also related to U.S. patent application No. 17/974,488 entitled "FORCE-QUIT FOR RECONFIGURABLE PROCESSORS" filed Oct. 26, 2022, which is also incorporated by reference herein.

FIELD OF THE TECHNOLOGY DISCLOSED

The present technology relates to reconfigurable architectures and other distributed processing architectures. In particular, it relates to force-quit for a reconfigurable processor.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language and Compiler for Application Accelerators," Proceedings of the 39th ACM SIGPLAN Conference on Programming Language Design and Implementation (PLDI), Proceedings of the 43rd International Symposium on Computer Architecture, 2018;

U.S. Non-provisional patent application Ser. No. 17/379, 924, filed on Jul. 19, 2021, titled "DATAFLOW ALL-REDUCE FOR RECONFIGURABLE PROCESSOR SYSTEMS";

U.S. Non-provisional patent application Ser. No. 17/127, 929, filed Dec. 18, 2020, titled "INTER-NODE BUFFER-BASED STREAMING FOR RECONFIGURABLE PROCESSOR-AS-A-SERVICE (RPaaS)";

U.S. Non-provisional patent application Ser. No. 17/127, 818, filed Dec. 18, 2020, titled "INTRA-NODE BUFFER-BASED STREAMING FOR RECONFIGURABLE PROCESSOR-AS-A-SERVICE (RPaaS)";

U.S. Non-provisional patent application Ser. No. 16/239, 252, filed Jan. 3, 2019, titled, "VIRTUALIZATION OF A RECONFIGURABLE DATA PROCESSOR";

U.S. Non-provisional patent application Ser. No. 16/197, 826, filed Nov. 21, 2018, titled, "CONFIGURATION LOAD OF A RECONFIGURABLE DATA PROCESSOR";

U.S. Non-provisional patent application Ser. No. 16/198, 086, filed Nov. 21, 2018, titled, "CONFIGURATION UNLOAD OF A RECONFIGURABLE DATA PROCESSOR";

U.S. Non-provisional patent application Ser. No. 16/260, 548, filed Jan. 29, 2019, titled, "MATRIX NORMAL/ TRANSPOSE READ AND A RECONFIGURABLE DATA PROCESSOR INCLUDING SAME";

U.S. Non-provisional patent application Ser. No. 16/536, 192, filed Aug. 8, 2019, titled, "COMPILER FLOW LOGIC FOR RECONFIGURABLE ARCHITECTURES";

U.S. Non-provisional patent application Ser. No. 16/407, 675, filed May 9, 2019, titled, "CONTROL FLOW BARRIER AND RECONFIGURABLE DATA PROCESSOR";

U.S. Non-provisional patent application Ser. No. 16/504, 627, filed Jul. 8, 2019, titled, "QUIESCE RECONFIGURABLE DATA PROCESSOR";

U.S. Non-provisional patent application Ser. No. 16/5Fpcu, 72,516, filed Sep. 16, 2019, titled, "EFFICIENT EXECUTION OF OPERATION UNIT GRAPHS ON RECONFIGURABLE ARCHITECTURES BASED ON USER SPECIFICATION";

U.S. Non-provisional patent application Ser. No. 16/744, 077, filed Jan. 15, 2020, titled, "COMPUTATIONALLY EFFICIENT SOFTMAX LOSS GRADIENT BACKPROPAGATION";

U.S. Non-provisional patent application Ser. No. 16/590, 058, filed Oct. 1, 2019, titled, "COMPUTATION UNITS FOR FUNCTIONS BASED ON LOOKUP TABLES";

U.S. Non-provisional patent application Ser. No. 16/695, 138, filed Nov. 25, 2019, titled, "COMPUTATION UNITS FOR BATCH NORMALIZATION";

U.S. Non-provisional patent application Ser. No. 16/688, 069, filed Nov. 19, 2019, titled, "LOOK-UP TABLE WITH INPUT OFFSETTING";

U.S. Non-provisional patent application Ser. No. 16/718, 094, filed Dec. 17, 2019, titled, "COMPUTATION UNITS FOR ELEMENT APPROXIMATION";

U.S. Non-provisional patent application Ser. No. 16/560, 057, filed Sep. 4, 2019, titled, "SIGMOID FUNCTION IN HARDWARE AND A RECONFIGURABLE DATA PROCESSOR INCLUDING SAME";

U.S. Non-provisional patent application Ser. No. 16/572, 527, filed Sep. 16, 2019, titled, "PERFORMANCE ESTIMATION-BASED RESOURCE ALLOCATION FOR RECONFIGURABLE ARCHITECTURES";

U.S. Non-provisional patent application Ser. No. 15/930, 381, filed May 12, 2020, titled, "COMPUTATIONALLY EFFICIENT GENERAL MATRIX-MATRIX MULTIPLICATION (GeMM)";

U.S. Non-provisional patent application Ser. No. 16/890, 841, filed Jun. 2, 2020, titled, "ANTI-CONGESTION FLOW CONTROL FOR RECONFIGURABLE PROCESSORS";

U.S. Non-provisional patent application Ser. No. 16/922, 975, filed Jul. 7, 2020, titled, "RUNTIME VIRTUALIZATION OF RECONFIGURABLE DATAFLOW RESOURCES";

U.S. Non-provisional patent application Ser. No. 16/996, 666, filed Aug. 18, 2020, titled, "RUNTIME PATCHING OF CONFIGURATION FILES";

U.S. Non-provisional patent application Ser. No. 17/023, 015, filed Sep. 16, 2020, "COMPILE TIME LOGIC FOR DETECTING STREAMING COMPATIBLE AND BROADCAST COMPATIBLE DATA ACCESS PATTERNS"; and U.S. Non-provisional patent application Ser. No. 17/031, 679, filed Sep. 24, 2020, "SYSTEMS AND METHODS FOR MEMORY LAYOUT DETERMINATION AND CONFLICT RESOLUTION".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including field programmable gate arrays (FPGAs), can be configured to implement a variety of functions more efficiently or faster than might be achieved using a general purpose processor executing a computer program. So-called coarse-grain reconfigurable architectures (e.g., CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA'17, Jun. 24-28, 2017, Toronto, ON, Canada.

Checkpointing, multitasking, and multiprogramming in distributed processing systems, such as CGRAs, present complex issues. Typically, the runtime control program can only load a configuration file and execute the machine as configured to completion, and thereafter allow the hardware to force-quit. There may be no capability to interrupt the machine during execution, for system management functions like pre-emptive multitasking and debug. In order to maximize operating efficiency, and to be able to coordinate among processing units on a processing system such as the configurable processing elements of a reconfigurable processor, a means of efficiently managing force-quit of processing units is needed.

SUMMARY

The present technology relates to force-quit of a reconfigurable processor having an array of configurable units, including force-quit of a particular sub-array of configurable units.

A reconfigurable processor is described, including an array of configurable units on an integrated circuit substrate, the array including a plurality of sub-arrays (or tiles) of configurable units, and a force-quit controller in a master address generation and coalescing unit (AGCU) in a particular sub-array in the plurality of sub-arrays, the force-quit controller configurable to receive a force-quit command from a runtime program running on a host processor, and generate force-quit control signals that reset configurable units in the particular sub-array.

In some aspects, the configurable units in the particular sub-array are connected in an interconnect topology (e.g., a daisy chain) that includes the particular master AGCU, a set of slave AGCUs, pattern memory units (PMUs), pattern compute units (PCUs), and switches.

In some aspects, the force-quit controller is further configurable to execute a force-quit process for the particular sub-array, including: transitioning the particular master AGCU from a current state, regardless of what that state may be, to a force-quit wait state in response to receiving a force-quit command from the runtime program, and while in the force-quit wait state: starting a force-quit counter, broadcasting the force-quit control signals to the configurable units in the particular sub-array, and de-asserting an output port of the particular master AGCU on the interconnect topology. Upon expiration of the force-quit counter, the force-quit controller is further configurable to transition the particular master AGCU from the force-quit wait state to a force-quit done state, and while in the force-quit done state: asserting the output port of the particular master AGCU on the interconnect topology once its input buffers and output buffers on the array level network are empty, sampling an input port of the particular master AGCU on the interconnect topology to detect that a last configurable unit on the interconnect topology has asserted its output port, sending a force-quit completion interrupt to the runtime program, and transitioning the particular master AGCU from the force-quit done state to an idle state in response to receiving an idle command from the runtime program.

Particular aspects of the technology disclosed are described in the claims, specification, and drawings.

BRIEF DESCRIPTION OF THE DRAWINGS

The technology will be described with reference to the drawings, in which:

FIG. 7 illustrates the format of force-quit bit sequences particular to four different tiles.

FIG. 10 illustrates another MAGCU state machine for executing a force-quit command.

FIG. 14 illustrates a configurable unit state machine for executing a force-quit command.

FIG. 15 illustrates a format of a force-quit timeout register.

FIG. 16 illustrates a format of a tile status register.

FIG. 17 illustrates a format of a quiesce control register.

Figure 1:
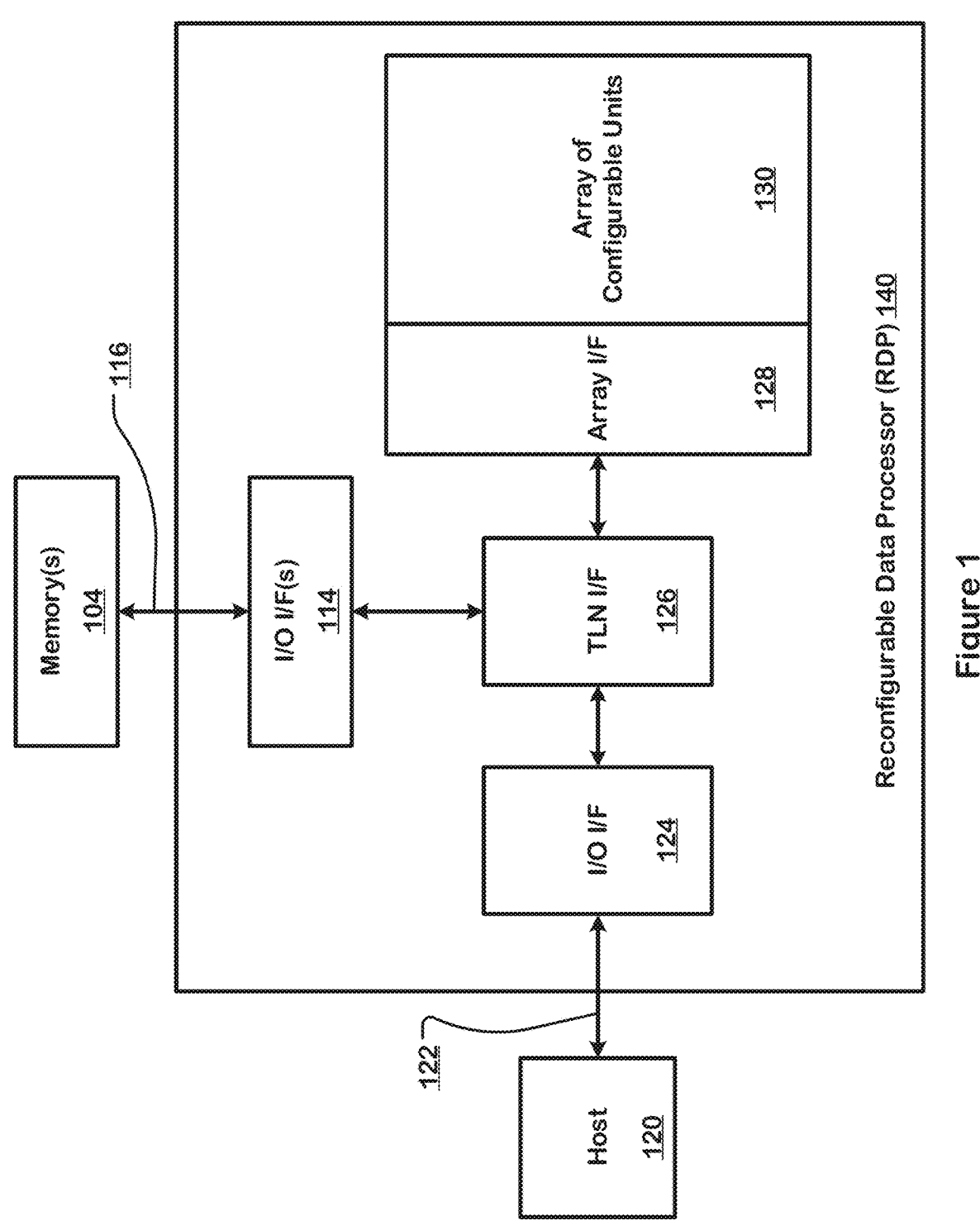
FIG. 1 illustrates an example system including a reconfigurable processor, a host, and a memory.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They are better suited for architectures that are optimized for parallel processing, such as coarse-grained reconfigurable architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

As reconfigurable processors increase the complexity and quantity of configurable units, so too do they become more likely to encounter a bug. In operation, it is likely that a hardware or software bug will manifest itself resulting in all or part of the system becoming unresponsive. Without force-quit functionality, one way to deal with an unresponsive system is to pull its plug, in other words, to somehow reduce its supply voltage to below an operating level to make the system crash so it can be restarted. This may be referred to as a cold reset. Such a procedure is challenging. It may be a challenge for a technician to identify and then to physically pull the plug. Also, powering down a particular component might require powering down the whole rack. Also, it may take a long time to power the system back on, executing all of the initialization tasks required by the system operating system.

Another way to handle an unresponsive portion of a system, such as a board or an integrated circuit (IC), is to reset the subsystem using a dedicated RESET input which may be referred to as a warm reset. The RESET input can put the subsystem into a known initial state, but can completely remove all configuration information which means the subsystem may need to be re-initialized. A re-initialization sequence may be very long which can have significant impact on system availability.

Without force-quit, debugging and resolving such bugs is also challenging. First, it will be a challenge to determine what caused the bug. If it was a hardware bug, what was the hardware that caused it? If it was a software bug, what was the software routine that caused it? In either case, it would be difficult and time-consuming to power the system back on to get it to the point of failure.

The disclosed force-quit functionality allows a graceful reset of an unresponsive reconfigurable processor. Force-quit provides a light-weight reset to gracefully put the reconfigurable processor into a state where it can load and execute a new graph program without needing software to re-initialize big parts of the system. This allows an unresponsive reconfigurable processor to recover without incurring an excessive system performance penalty.

Disclosed is a reconfigurable processor that includes an array of configurable units that can be partitioned into sub-arrays (or tiles) of configurable units. Each sub-array (or tile) includes a force-quit controller in a master address generation and coalescing unit (MAGCU). The force-quit controller can be commanded by a runtime program running on a host to execute a force-quit process on one or more tiles. Irrespective of the state the MAGCU state machine or the state of any of the configurable units' state machines, the force-quit process will cause MAGCU and the configurable units on its tile, using force-quit logic in each configurable unit of the tile, to abandon whatever operation they were performing and reset to an idle state.

In operation, the runtime program can detect a need to force-quit a particular tile, and issue a force-quit command to that tile's MAGCU. In response, MAGCU, regardless of the state of its state machine, will transition to a force-quit-wait state immediately and regardless of what state it was in. While in the force-quit wait state, MAGCU will broadcast a force-quit command to reset all of the configurable units in its sub-array and will not route any register read or write requests to any of the units. Upon receiving the force-quit command, each of the configurable units will transition immediately from whatever state they were in to a force-quit-drain state, during which they will drain their input and output buffers, allow internal execution pipelines to drain without feeding new data to them, allow output buffers to drain to the system bus without adding new items, reset internal counters, reset internal state machines, and further actions as described herein and with respect to FIG. 14. Each configurable unit will stay in the force-quit drain state for a fixed amount of time, during which it is reset, meaning their input and output buffers are empty, their internal state machines are reset, their execution pipelines are empty, and their counters and credits are reset. After this, the configurable unit transitions to a force-quit done state where it waits for the command to transition to the IDLE state.

MAGCU, for its part, will remain in the force-quit wait state until expiration of a programmable force-quit-wait timeout counter. After expiration of the counter, MAGCU will set a bit in its tile status register indicating completion of force-quit and will set a different bit in the tile status register if all of the configurable units have completed the force quit without errors (i.e. all state in the configurable units of the tile, including AGCUs, was reset successfully, and will issue a force-quit complete interrupt to the runtime program.

In this way, with the use of the force-quit process, the reconfigurable processor can be gracefully reset whenever it becomes unresponsive. Indeed, a reconfigurable processor that is unresponsive may have some state machine that is stuck in some state; the force-quit process can reset such state machines. The reconfigurable data processor can go from being unresponsive before the force-quit to being responsive after the force-quit. The runtime program can then freely execute whatever program it chooses. Or, to troubleshoot, test cases can be used to repeat the failure with checkpointing to figure out how to fix it. Moreover, to maximize data center uptime, the host processor could try and debug one tile at a time, while allowing other tiles to continue operations. Moreover, force-quit can be executed remotely by a technician, without having to find and access hardware.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).

AI—artificial intelligence.

ALN—array-level network.

Buffer—an intermediate storage of data.

Compiler—a translator that processes statements written in a programming language to machine language instructions for a computer processor. A compiler may include multiple stages to operate in multiple steps. Each stage may create or update an intermediate representation (IR) of the translated statements.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

Configurable unit—a circuit that can be configured and reconfigured to locally store data (e.g., a memory unit or a PMU), or to execute a programmable function (e.g., a compute-unit or a PCU). A configurable unit includes hardwired functionality that performs a limited number of functions used in computation graphs and dataflow graphs. Further examples of configurable units include a CU and an AG, which may be combined in an AGCU. Some implementations include configurable switches, whereas other implementations may include regular switches.

CU—coalescing unit.

Datapath—a collection of functional units that perform data processing operations. The functional units may include memory, multiplexers, ALUs, SIMDs, multipliers, registers, buses, etc.

FCMU—fused compute and memory unit—a configurable unit that includes both a configurable memory unit and a configurable compute unit.

FIFO—first-in, first-out; usually applicable to a buffer.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

ML—machine learning.

PCU—pattern compute unit—a compute unit that can be configured to perform one or more operations. A PCU is also a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. Reconfigurable processors may include pipelines at different levels. For example, a compute unit may include a pipeline at the gate level to enable correct timing of gate-level operations in a synchronous logic implementation of the compute unit, and a meta-pipeline at the graph execution level to enable correct timing of node-level operations of the configured graph. Gate-level pipelines are usually hard wired and unchangeable, whereas meta-pipelines are configured at the reconfigurable processor, array of reconfigurable units' level, and/or reconfigurable unit level.

Pipeline Stages—a pipeline is divided into stages that are coupled with one another to form a pipe topology.

PMU—pattern memory unit—a memory unit that can locally store data. A PMU is also a memory unit that can store data according to a programmed pattern.

SIMD—single-instruction multiple-data—an arithmetic logic unit (ALU) that simultaneously performs a single programmable operation on multiple data elements delivering multiple output results.

TLN—top level network.

Implementations

The architecture, configurability, and dataflow capabilities of an array of configurable units enable increased compute power that supports both parallel and pipelined computation. A reconfigurable processor, which includes one or more arrays of configurable units can be programmed to simultaneously execute multiple independent and interdependent dataflow graphs. To enable simultaneous execution, the dataflow graphs may need to be distilled from a high-level program and translated to a configuration file for the reconfigurable processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMO, USE, Transformer, and Transformer-XL.

Translation of high-level programs to executable bit files is performed by a compiler. While traditional compilers sequentially map operations to processor instructions, typically without regard to pipeline utilization and duration (a task usually managed by the hardware), an array of configurable units requires mapping operations to processor instructions in both space (for parallelism) and time (for synchronization of interdependent computation graphs or dataflow graphs). This requirement implies that a compiler for a reconfigurable processor must decide which operation of a computation graph or dataflow graph is assigned to which of the configurable units, and how both data and, related to the support of dataflow graphs, control information flows among configurable units, and to and from external hosts and storage. This process, known as "place and route", is one of many new challenges posed to compilers for arrays of configurable units.

FIG. 1 illustrates an example system including a reconfigurable processor, a host, and a memory. Reconfigurable processor 140 (or reconfigurable data processor or RDP) has a reconfigurable architecture and includes an array of configurable units 130 (or processing units). The array of configurable units 130 can include pattern compute units (PCU), pattern memory units (PMU), switches, and address generator and coalesce units (AGCU), and can be partitioned into a plurality of sub-arrays, referred to herein as tiles. The configurable units in each tile each contain force-quit circuitry for use during a force-quit process and a configuration data store for use during a program load process. Configurable units of each tile further include input and output buffers, and an execution pipeline, and an example configurable compute unit is further described and illustrated with respect to FIG. 12. The configurable units in a tile are connected to each other in an array level network (ALN) and with TLN interface 126 via array interface 128. Examples of tiles and connections among configurable units contained therein are further described and illustrated with respect to FIG. 3, FIG. 4, and FIG. 11.

Reconfigurable processor 140 further includes IO interface 124, which provides access to host 120 via link 122 (e.g., PCIe link). Host 120 may be or include a computer that runs runtime processes, such as a runtime program as described in FIG. 5 and a compiler. IO interface 124 comprises a link interface (e.g., PCIe interface) controlled by an interface agent (e.g., P-Shim), as are further illustrated and described with respect to FIG. 6 and FIG. 8. Reconfigurable processor 140 further includes IO interface(s) 114 to memory(s) 104 over memory bus 116. IO interface(s) 114 is controlled by another interface agent (e.g., D-Shim) as illustrated and described with respect to FIG. 2.

In some implementations, reconfigurable processor 140 may include one or more ICs. In other implementations, a single IC may span multiple coarsely reconfigurable data processors. Reconfigurable processor 140 can be implemented on a single integrated circuit (IC) substrate or die or on a multichip module (MCM). An IC can be packaged in a single chip module or a multichip module. An MCM is an electronic package that may include multiple IC dies and other devices, assembled into a single module as if it were a single device. The various dies of an MCM may be mounted on a substrate, and the bare dies of the substrate are electrically coupled to the surface or to each other using for some implementations, wire bonding, tape bonding or flip-chip bonding.

The configurable units in the array of configurable units 130 provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing.

Reconfigurable processor 140 may accomplish computational tasks by executing a configuration file (for example, a PEF file). For the purposes of this description, a configuration file corresponds to a dataflow graph, or a translation of a dataflow graph, and may further include initialization data. A compiler running on host 120 compiles the high-level program to provide the configuration file. In some implementations, array of configurable units 130 is configured during a program load process by programming one or more configuration stores with all or parts of the configuration file. A single configuration store may be at the level of the reconfigurable processor 140 or the array of configurable units 130, or at the level of a sub-array (or tile). The configuration file may include configuration data for the array of configurable units 130 and configurable units in the array and link the computation graph to the array of configurable units 130. Execution of the configuration file by reconfigurable processor 140 causes the array of configurable units 130 to implement the user algorithms and functions in the dataflow graph.

In operation the need to force-quit a sub-array (tile) can be generated by an external event outside the sub-array. Or the need to force-quit a sub-array (or tile) can be generated by an event inside the sub-array. Or the need to force-quit a sub-array (or tile) can be generated because the sub-array (or tile) has become unresponsive due to a hardware bug or a software bug.

Figure 2:
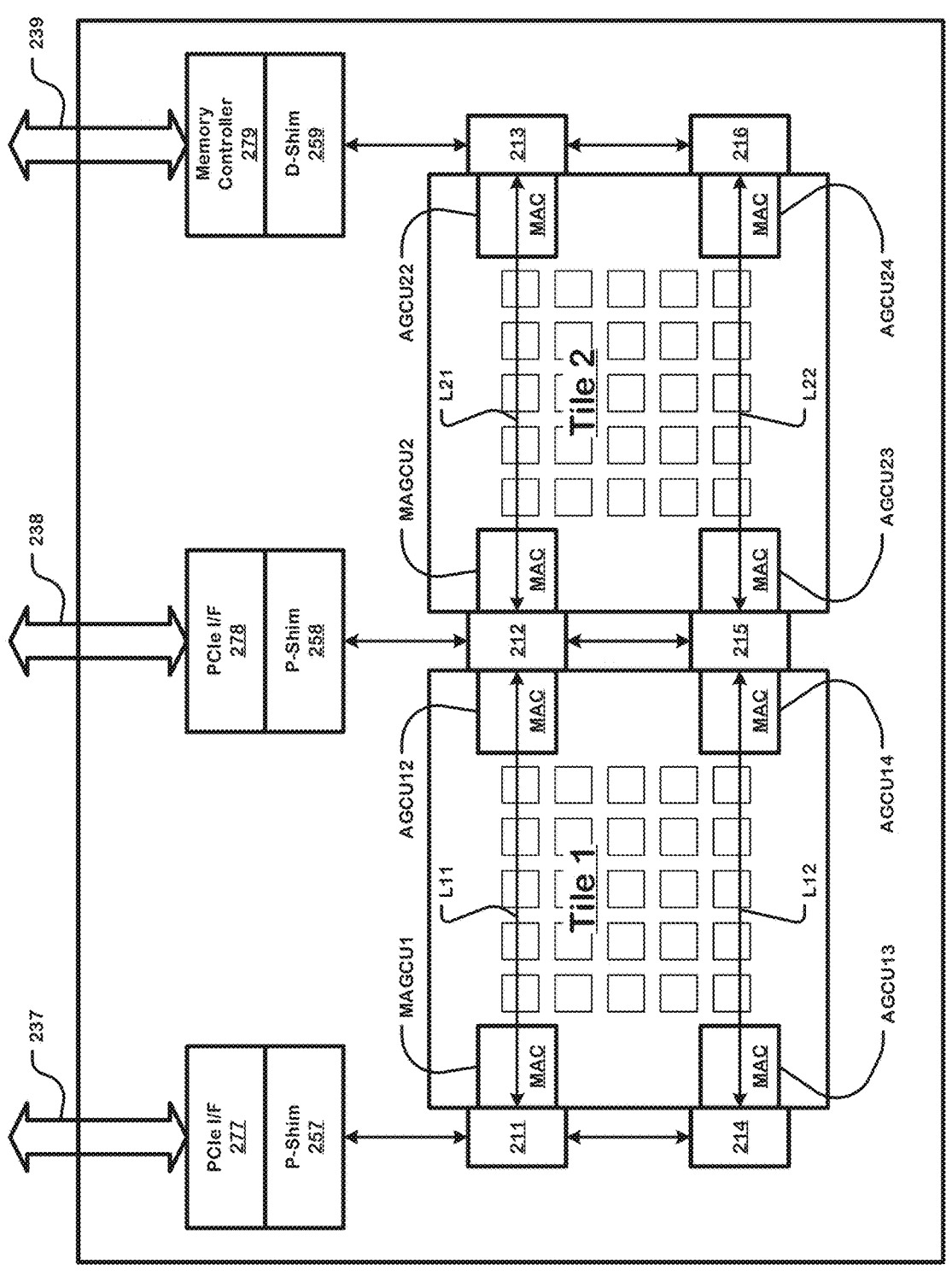
FIG. 2 illustrates a reconfigurable processor connecting two tiles to three IO interfaces.

FIG. 2 illustrates a reconfigurable processor connecting two tiles to three IO interfaces. The two tiles, Tile 1 and Tile 2, each contain a sub-array of configurable units. In some implementations, Tile 1 and Tile 2 may be on the same integrated circuit substrate. An array of configurable units comprises configurable units (e.g., PMUs, PCUs) coupled via an array-level network (ALN), e.g., a bus system. Each depicted tile (or sub-array) has four AGCUs, one of which is a master AGCU (MAGCU) and the other three are slave AGCUs (e.g., MAGCU1, AGCU12, AGCU13, and AGCU14 in Tile 1 and MAGCU2, AGCU22, AGCU23, and AGCU24 in Tile 2). The AGCUs interface the ALNs to the TLN and route data from the TLN to the ALN or vice versa.

The TLN is constructed using top level switches (switch 211, switch 212, switch 213, switch 214, switch 215, and switch 216) coupled with each other as well as with other circuits on the TLN, including the AGCUs and external interfaces. For example, switch 211 can couple MAGCU1 to PCIe link 237 via PCIe interface 277 via P-Shim 257 (PCIe shim). Similarly, switch 212 can couple MAGCU2 to PCIe link 238 via PCIe interface 278 via P-Shim 258.

The TLN includes links (e.g., L11, L12, L21, L22 are labeled) coupling the top level switches. Data may travel in packets between the top level switches on the links, and from the switches to the circuits on the top level network coupled with the switches. For example, switch 211 and switch 212 are coupled by link L11, switch 214 and switch 215 are coupled by link L12, switch 212 and switch 213 are coupled by link L21, and switch 215 and switch 216 are coupled by link L22. The links can include one or more buses and supporting control lines, including for example a chunk-wide bus (vector bus). For example, the top level network can include data, request, and response channels operable in coordination for transfer of data in any manner known in the art.

Circuits on the TLN in this example include one or more external IO interfaces, including PCIe interface 277 (associated with P-Shim 257 and PCIe link 237), PCIe interface 278 (associated with P-Shim 258 and PCIe link 238). and memory interface 279 (associated with D-Shim 259 and memory bus 239). The interfaces to external devices include circuits for routing data among circuits coupled with the TLN and external devices, such as high-capacity memory, host processors, other reconfigurable processors, FPGA devices, and so on, that are coupled with the interfaces.

One of the AGCUs in each tile in this example is configured to be a master AGCU (MAGCU) and includes a force-quit controller and an array configuration load/unload controller for the tile. MAGCU1 includes a force-quit controller useable to assist in conducting a force-quit process for Tile 1. MAGCU1 also includes a configuration load/unload controller to assist in conducting a program load process for Tile 1. Similarly, MAGCU2 includes a force-quit controller to assist with force-quit and a configuration load/unload controller to assist with program load for Tile 2.

Figures 3, 3A:
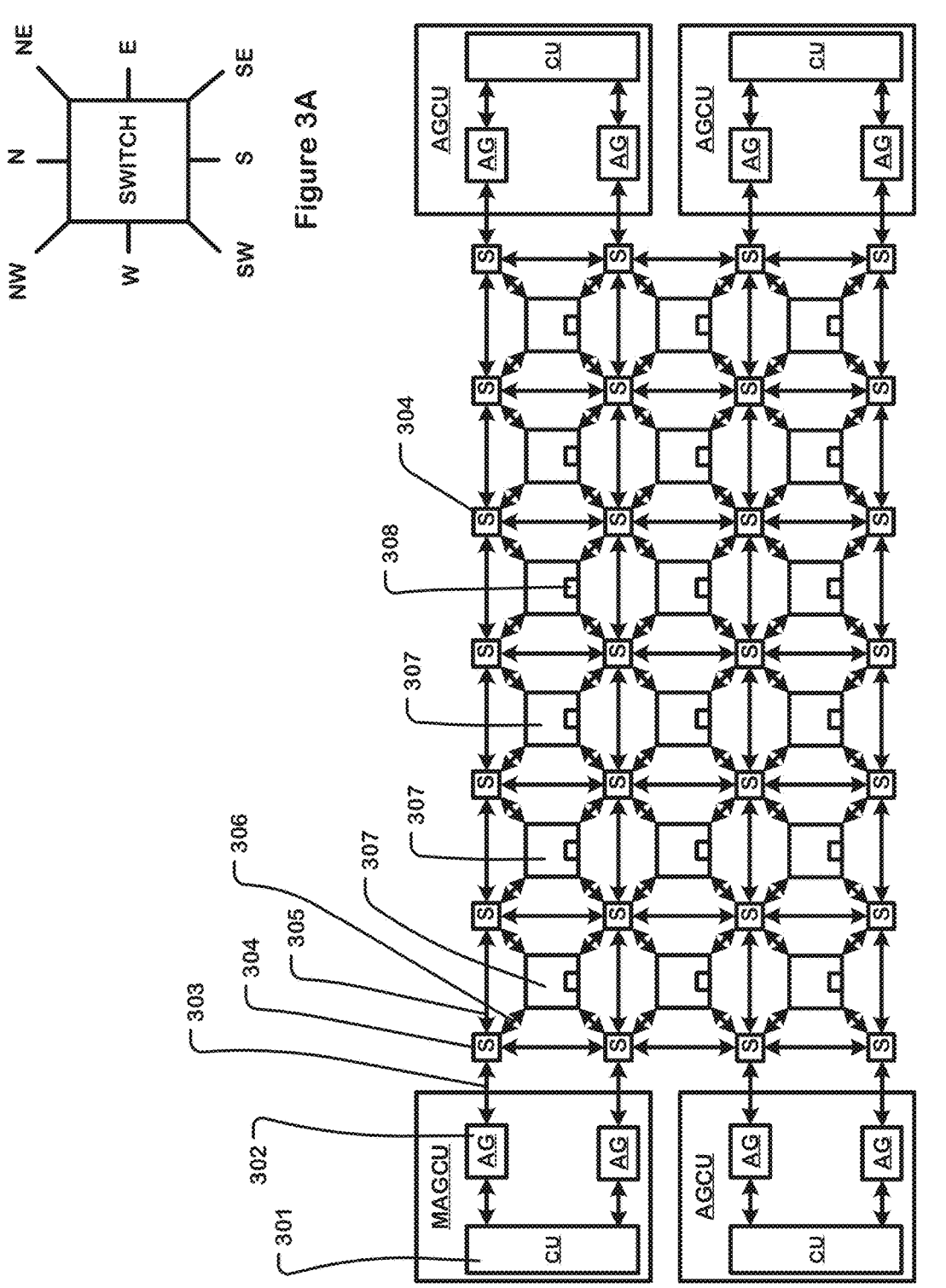
FIG. 3 illustrates an example tile comprising a sub-array of configurable units in an ALN.
FIG. 3A illustrates a switch configurable unit, which may have eight interfaces.

FIG. 3 illustrates an example tile comprising a sub-array of configurable units in an ALN. In some implementations, the components of the tile may be on the same integrated circuit substrate. The tile represents a sub-array or partition of the array of configurable units 130 (FIG. 1) making up the reconfigurable processor. The tile may include several types of configurable units 307, such as FCMUs, PMUs, PCUs, switches, memory units, and/or compute units. The illustrated tile contains a plurality of address generating and coalescing units (AGCUs), one of which is a master AGCU (MAGCU) and the other three are slave AGCUs. For examples of the functions of these types of configurable units, see Prabhakar et al., "Plasticine: A Reconfigurable Architecture for Parallel Patterns", ISCA 2017 June 24-28, 2017, Toronto, ON, Canada. Each of the configurable units may include a configuration store 308 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each configurable unit 307 comprises an FCMU. In other implementations, the array comprises both PMUs and PCUs, or memory units and compute units, arranged in a checkerboard pattern. In yet other implementations, configurable units may be arranged in different patterns. The ALN includes switch units 304 (S), and three slave AGCUs (each including an address generator, e.g., 302 and a shared coalescing unit, e.g., 301). Switch units 304 are connected among themselves via interconnects 305 and to a configurable unit 307 with interconnects 306. Switch units 304 may be coupled with address generators (e.g., 302) via interconnects 303. In some implementations, communication channels can be configured as end-to-end connections, and switch units 304 are configurable units. In other implementations, switches route data via the available links based on address information in packet headers, and communication channels established as and when needed.

A configuration file may include configuration data representing an initial configuration, or starting state, of each of the configurable units that execute a high-level program with user algorithms and functions. Program load is the process of setting up the configuration stores in the tile based on the configuration data to allow the configurable units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 305 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the tile's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A configurable unit 307 may have four ports (as drawn) to interface with switch units 304, or any other number of ports suitable for an ALN. Each port may be suitable for receiving and transmitting data, or a port may be suitable for only receiving or only transmitting data.

FIG. 3A illustrates a switch configurable unit, which may have eight interfaces. The North, South, East and West interfaces of a switch unit may be used for links between switch units using interconnects 305. The Northeast, Southeast, Northwest and Southwest interfaces of a switch unit may each be used to make a link with an FCMU, PCU or PMU instance using one of the interconnects 306. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a tile after configuration, data can be sent via one or more switch units and one or more links between the switch units to the configurable units using the vector bus and vector interface(s) of the one or more switch units on the ALN.

A data processing operation implemented by a tile configuration may comprise multiple graphs or subgraphs specifying data processing operations that are distributed among and executed by corresponding configurable units (e.g., FCMUs, PMUs, PCUs, AGs, and CUs).

Figure 4:
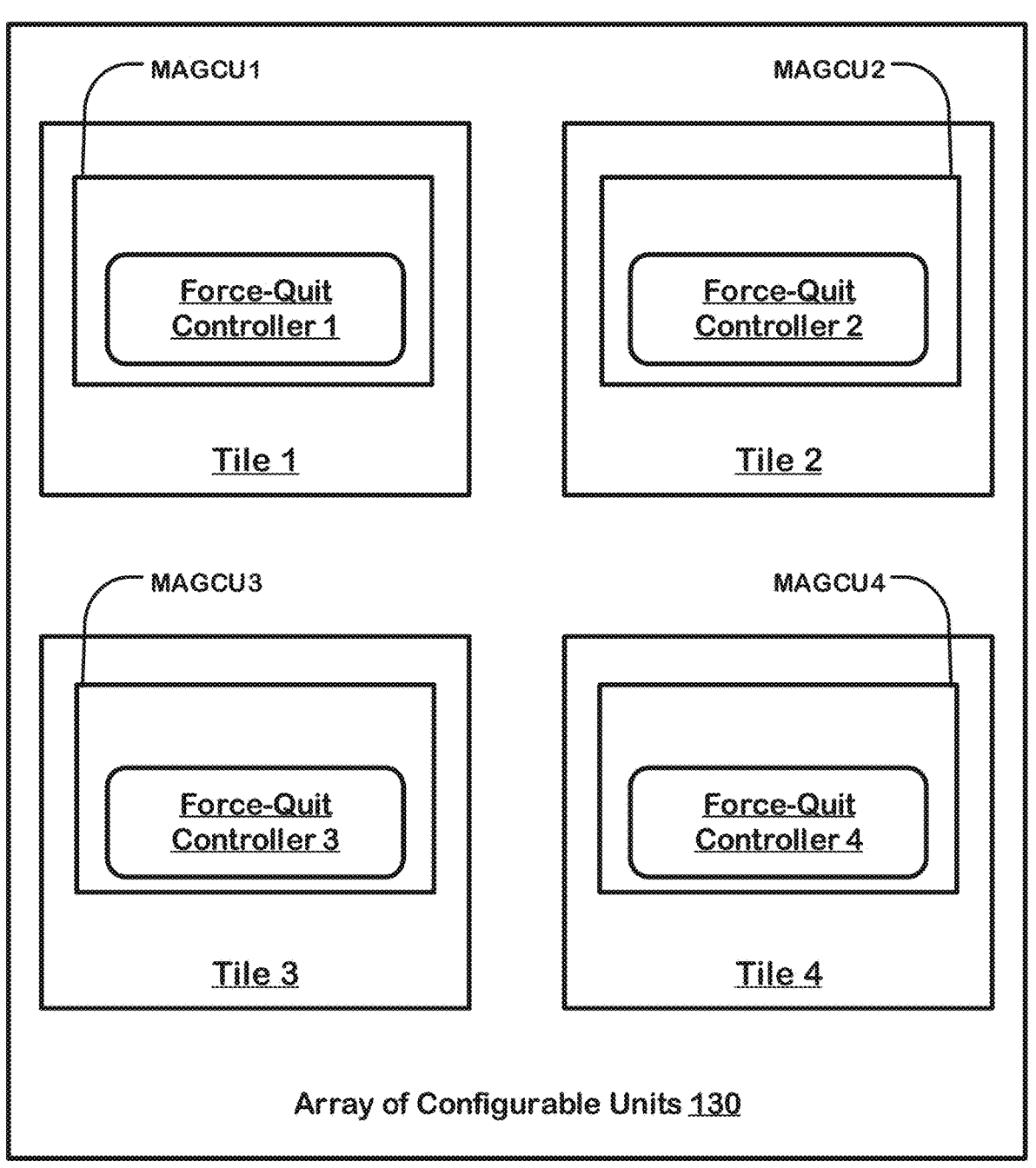
FIG. 4 illustrates four sub-arrays (or tiles) of an array of configurable units.

FIG. 4 illustrates four sub-arrays (or tiles) of an array of configurable units. As shown, array of configurable units 130 includes four sub-arrays, labeled tile1, tile2, tile3, and tile4. Each of the tiles includes 4 AGCUs, one of which one is a master AGCU that includes a force-quit controller, the other three being slave AGCUs that include force-quit logic to perform the component state machine of FIG. 14. The MAGCUs included in tile 1, tile 2, tile 3, and tile 4, are labeled as MAGCU1, MAGCU2, MAGCU3, and MAGCU4, and include force-quit controller 1, force-quit controller 2, force-quit controller 3, and force-quit controller 4, respectively. The force-quit controllers control execution of the force-quit process as illustrated and described with respect to FIG. 9 and FIG. 10.

Figure 5:
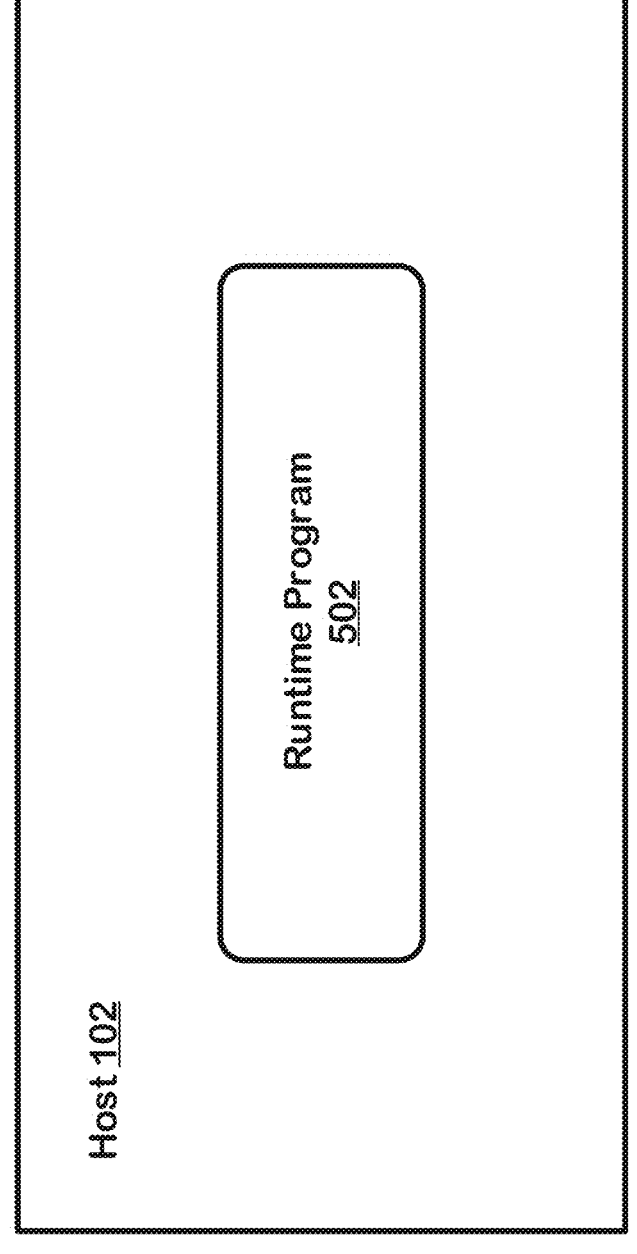
FIG. 5 illustrates a host processor and a runtime program running thereon.

FIG. 5 illustrates a host processor and a runtime program running thereon. As shown, host 102 is a processing device like host 102 of FIG. 1 and has a runtime program 502 running on it. Though not shown, host 102 may also have a compiler program running on it in some cases.

Figure 6:
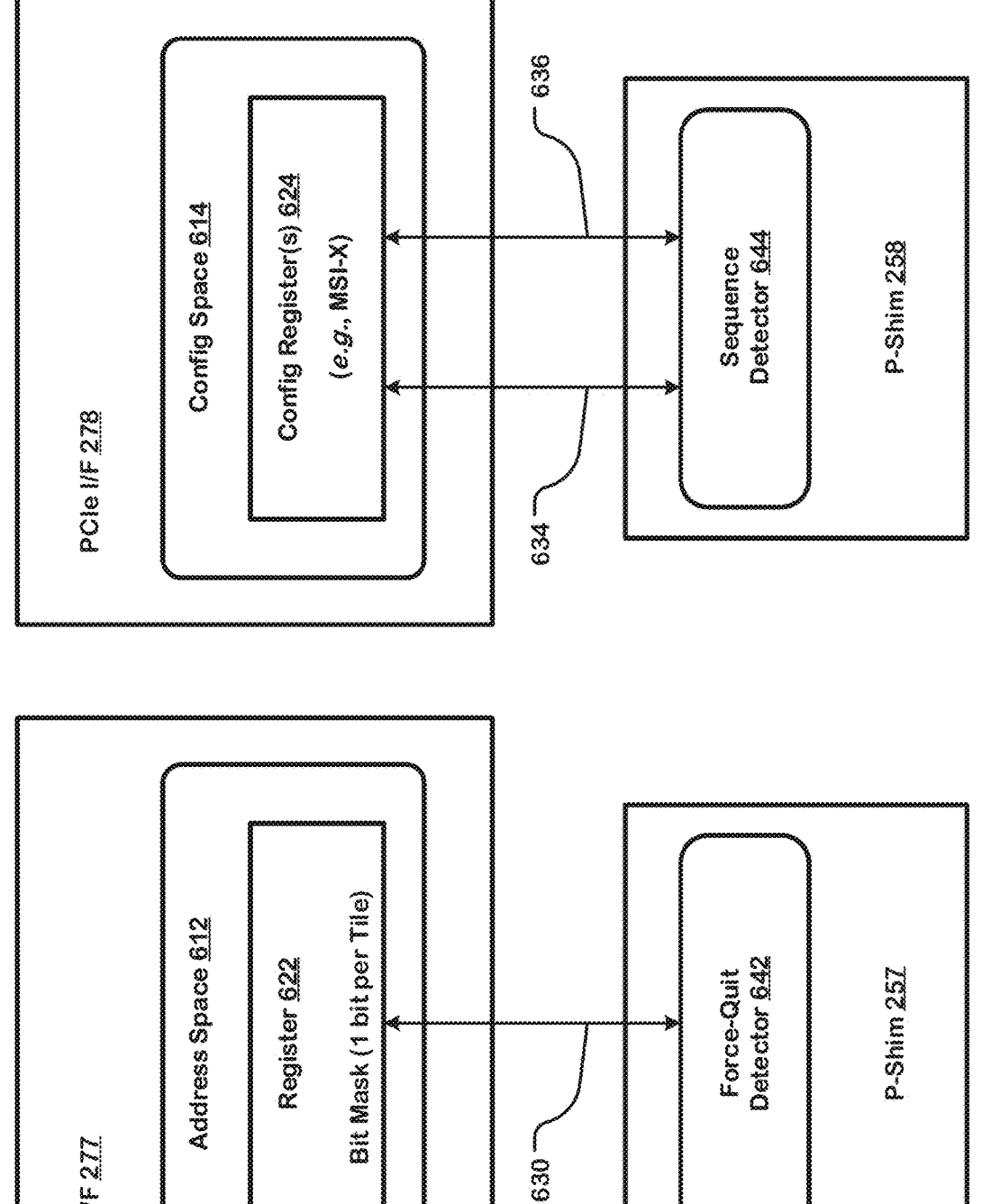
FIG. 6 illustrates a plurality of P-Shims (PCIe interface agents).

FIG. 6 illustrates a plurality of P-Shims (or PCIe interface agents) 257, 258 which are respectively coupled to PCIe Interfaces 277, 278. In the example shown, the two P-Shim/PCIe Interface sets 257/277, 258/278 implement two different mechanisms to initiate a Force-Quit to one or more sub-arrays in a reconfigurable processor.

The first PCI Interface 277 is configured to claim an address space 612 that includes a register 622. Depending on the implementation, the address space 612 may be PCI configuration space or PCIe extended configuration space that includes the register 622, or an I/O or memory address space configured through a Base Address Register in PCI configuration space for the PCIe Interface 277 that includes the register 622 at a predetermined offset in the address space. The register 622 is accessible to the runtime program 502 running on the host 102 to allow the runtime program 502 to initiate a force-quit in one or more sub-arrays of the reconfigurable processor through a PCIe link coupled between the host 102 and the PCI Interface 277. The register 622 includes a force-quit bit mask with 1 bit for each sub-array in the array of configurable units in the reconfigurable processor.

The output of the register 622 sends the value 630 written into the bit mask by the runtime processor to a force-quit detector in the P-Shim 257. The force-quit detector 642 can detect which bits in the bit mask are asserted and send a force-quit signal to the sub-array(s) that correspond to the asserted bits in the bit mask. So for example, if a reconfigurable processor includes four sub-arrays, the bit mask can have 4 bits, one for each sub-array. And as a further example, if a 0b0001 is written to the bit mask, the first sub-array is sent a force-quit signal but the other three are unaffected and can continue to execute the program graph that they are configured to run. A write of 0b1111 to the bit mask would send a force-quit signal to all four sub-arrays.

As is known, the PCIe standard defines three independent address ranges that require different bus commands to access: configuration address space (with extended configuration address space), memory address space, and IO address space. Each PCIe interface (or endpoint) has its own configuration address space which is accessed using information about the logical location of that PCIe interface in the PCI host complex which may include multiple PCIe links coupled through PCIe-PCI-bridges. Each PCIe interface is programmed (using accesses to its configuration space) to accept memory accesses and/or IO accesses to specific address ranges assigned to that PCIe Interface. Config register 622 can be accessed, for example by the runtime program using PCIe config space commands, CfgRd or CfgWr. In other implementations, as a matter of design choice, register 622 can be mapped to the IO space or memory space of PCIe Interface 277 defined by a Base Address Register in the PCIe Interface 277.

In an alternative implementation, a runtime program running on host 120 triggers the force-quit process by issuing a sub-array-specific (or tile-specific) force-quit bit sequence of PCIe writes to the PCIe address of config register 624 in PCIe Interface 278. For example, config register 624 can be the MSI-X Message Control register in the configuration space 614 of PCI Interface 278, and the runtime program can write to bit [15] (MSI-X enable) and bit [14] (Function Mask).

The runtime program will not write 2'b10 to those two bits of the MSI-X register because doing so would enable P-shim interrupts (Normally, P-shims can be used to issue interrupts from configurable units in the tile to the runtime program, but Interrupts are to be suppressed during the force-quit process, so P-shim 258 will enqueue interrupt requests detected during force-quit and allow them to be serviced afterwards). So, the runtime program will write sequences of b00, b01, and b11 to bits [15:14] of the MSI-X Message Control register in the example implementation to send a force-quit command to a specific sub-array. PCIe interface 278 detects PCIe writes on the PCIe link 238 addressed to config register 624, which is included in its config space 614. Bits and of the MSI-X Message Control register are routed directly from the PCIe interface 278 to P-shim 258 on two separate connections, bit 634 and bit 636. P-Shim 258 includes sequence detector 644, which is coupled to wires 634 and 636 to receive the two bits of config register 624 in the config space 614 of PCIe interface 278. P-Shims 257, 258 and other P-Shims in the reconfigurable processor are connected via the top level network to each other and to the AGCUs, and may or may not be on the same integrated circuit substrate as the array, as a matter of implementation design choice.

In the example shown, the tile-specific force-quit bit sequence has three parts: a function header, a function select, and a sub-array-specific function argument. The sub-array-specific function argument makes the sub-array-specific, force-quit bit sequence useable to select a particular sub-array (or tile) and is specific to the particular sub-array (or tile). P-shim 257 uses sequence detector 644 (also a type of force-quit detector) to monitor the two bits, bit 634 and bit 636 from the config register 624, and to detect the sub-array-specific (or tile-specific) force-quit bit sequence from the two bits, bit 634 and bit 636, and sends a dedicated force-quit command strobe to the addressed MAGCU (not shown) over a global wire. PCIe interface 278 operates to suppress interrupts during force-quit and enqueuing them to be serviced afterwards because 0b10 is never written to bits 15 and 14, which is the only state that enables MSI-X interrupts to be sent. Transmission of the force-quit command strobe may be signaled using any type of edge-sensitive or level-sensitive manner, but can consist of switching between a low level signal and a high level signal as one example.

In some implementations, global wires connect the P-shims to the MAGCUs. They are referred to as global wires because they may cross unit boundaries of functional units on the IC. One global wire connects one P-Shim with one MAGCU so the number of global wires may be as many as the number of P-Shims multiplied by the number of MAGCUs. The global wires can send a strobe signal from a particular P-Shim to a particular MAGCU. A strobe signal can be level-sensitive signal with an active (or asserted) state (either high or low depending on a design choice signaling a force-quit command, and the opposite level being an inactive or deasserted state. The strobe signal can alternatively be an edge-sensitive signal where one or both of a transition from a high state to a low state or a low state to a high state can signal a force-quit command.

In one implementation, routing the bits (either a bit-mask or a set of wires used for a sequence to send a signal) directly from a register in the PCI interface to the P-shim and sending the force-quit command strobe to the addressed MAGCU by a global wire, has the advantage of being likely to succeed even if the system is otherwise unresponsive. It is possible that normal TLN transactions used to communicate between the P-shims and MAGCUs are inoperative when the tile is unresponsive. It is also possible that the ALN or daisy chained command bus are inoperative when the tile is unresponsive. Using the wires from the PCIe Interface to the force-quit detector in the P-Shim and then global wires from the P-Shim to the force-quit controllers in the MAGCUs means that only the PCI interface, the force-quit detector, and the force-quit controllers (and force-quit circuits in the configurable units) need to be operating to successfully execute a force-quit command.

FIG. 7 illustrates the format of example force-quit bit sequences particular to four different tiles consistent with the sequence detector 644 in P-Shim 258 of FIG. 6. Other implementations may use a different format that may or may not be segmented into multiple parts. As also shown as one example in Table 1 (which duplicates information found in FIG. 7), all four of the tile-specific force-quit bit sequences have three parts. The first part is Function Header 702*a*, which in this example is the same for all four tiles. The second part is Function Select 702*b*, which in this example is also the same for all four tiles. The third part, Function Argument 702*c*/712*c*/722*c*/732*c*, is particular to each tile and can be used to identify a tile. Each part can include one or more sequential sets of values written to the configuration register. For example, the Function Header 702*a* may be indicated by a b00 followed by a b11. the Function Select 702*b* may be indicated by a b11, and the Function Argument 702*c* may be indicated by a b00 followed by a b01. In operation, then, the runtime program will send one of the four bit-sequences, using the third part of the sequence to identify a tile.

TABLE 1

| Tile-Specific Force-Quit Bit Sequence | | | |
|---|---|---|---|
| Tile 1 Force-Quit Bit Sequence 702 | Function Header 702a | Function Select 702b | Function Argument 702c |
| Tile 2 Force-Quit Bit Sequence 712 | Function Header 702a | Function Select 702b | Function Argument 712c |
| Tile 13 Force-Quit Bi44 Sequence 722 | Function Header 702a | Function Select 702b | Function Argument 722c |
| Tile 1 Force-Quit Bit Sequence 732 | Function Header 702a | Function Select 702b | Function Argument 732c |

Each part can include one or more sequential sets of values written to the MSI-X configuration register. As mentioned above, the sequence can consist of any two-bit value except for b10 to the upper two bits of the MSI-X configuration register. So, for example, the Function Header 702*a* may be indicated by a sequence of b00 followed by b11 and then b00 written to the upper bits of MSI-X. The Function Select 702*b* may be indicated by a sequence of b00, b01, b00 written to the upper bits of MSI-X. Note that this sequence structure can be used to send other commands to the reconfigurable processor by using a different sequence for the Function Select value, such as b00, b01, b11. The particular sub-array may be indicated by using different sequences for the function argument, such as b00, b00, b00 for Function Argument 702*c* indicating a force-quit for sub-array 1, b00, b01, b00 for Function Argument 712*c* indicating a force-quit for sub-array 2, b11, b00, b00 for Function Argument 722*c* indicating a force-quit for sub-array 3, and b11, b11, b00 for Function Argument 732*c* indicating a force-quit for sub-array 4. Other implementations can use any appropriate sequence or mask, depending on the implementation.

Figure 8:
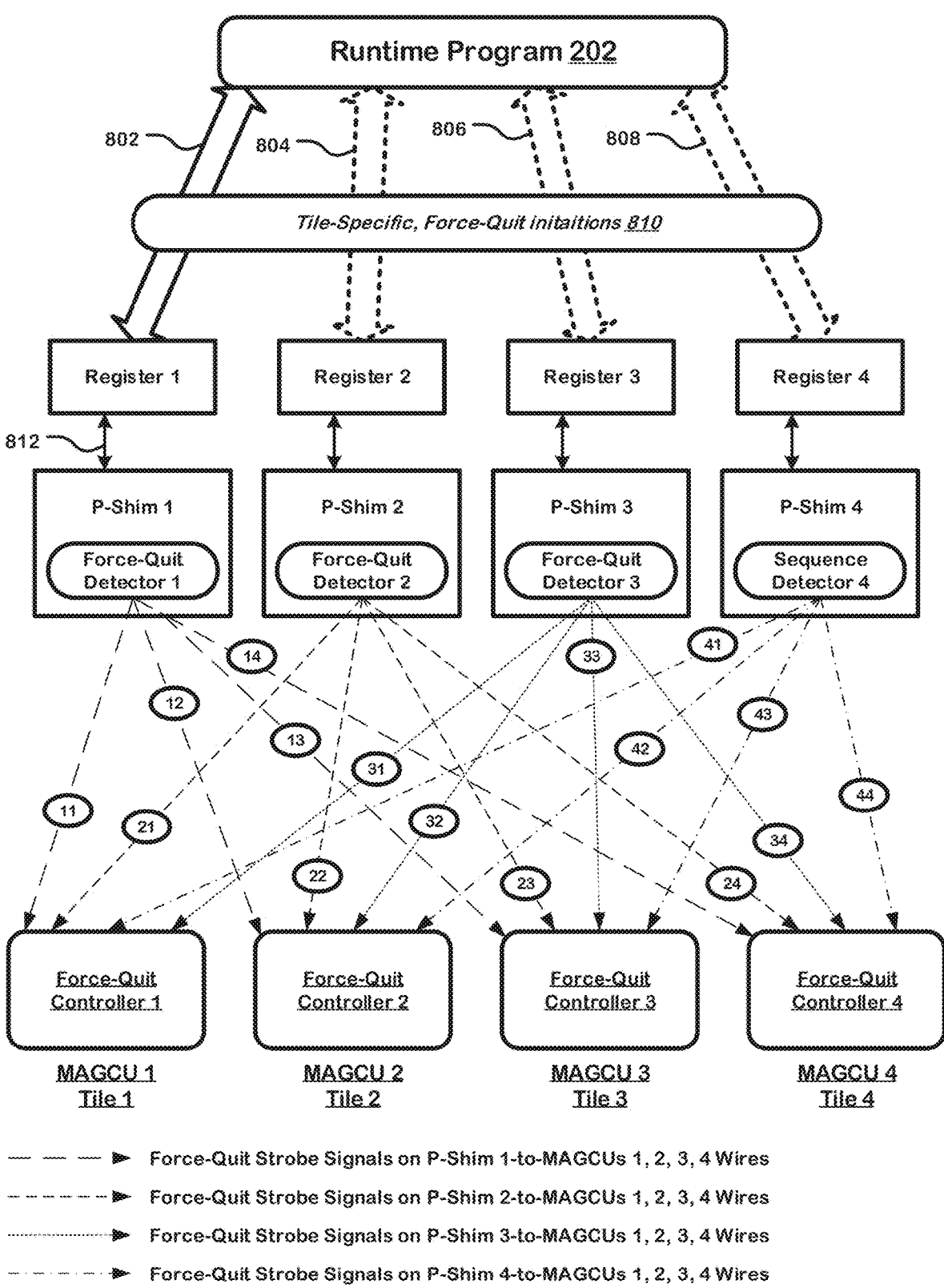
FIG. 8 illustrates a runtime program sending force-quit commands to any of four tiles.

FIG. 8 illustrates a runtime program sending force-quit commands to any of four tiles. PCIe links 804, 806, and 808 are optional, as indicated by their dashed lines. The number of tiles in a particular reconfigurable processor is variable and can be different depending on the implementation. A reconfigurable processor may have just two tiles, for example as shown in FIG. 6.

As shown, runtime program 202, running on a host processor, is connected through PCIe links 802, 804, 806, and 808 (so called interface buses) to config registers labeled config register(s) 1, 2, 3, and 4, each of which is located in an address space of its respective PCIe interface (or endpoint). In one implementation, the config register corresponds to the PCIe MSI-X Message Control register and Bit 15, MSI-X Enable, and Bit 14, Function Mask, are sent to the associated P-Ship over wire 812. In this implementation 0b10 are never sent to those bits during force-quit because that would enable interrupts. In other implementations, the register may another register in configuration space, or a location in an I/O space or memory space defined by a Base Address Register in the PCIe Interface that is used to send a bit-map to its associated P-Shim over wires 812.

Also shown are four P-Shims (so called interface agents) that each includes a force-quit detector capable of monitoring the bits sent from the register by a direct connection. The force-quit detector may simply look for asserted bits in a bit mask or may detect one of a specific set of sequences as described in FIG. 7, or any other mechanism to determine that a force-quit signal is being sent to one or more sub-arrays.

When a force-quit bit is detected, the P-Shim containing that force-quit detector can generate and send a force-quit strobe to the force-quit controller of the particular MAGCU that was identified by the bits received from the register. In one implementation, a bit mask is used with one bit per sub-array to indicate that the associated sub-array should receive a force-quit strobe. In another implementation, the force-quit detector is a sequence detector the detects a force-quit bit sequence with three parts and the third part, the sub-array-specific function argument, makes the bit sequence specific to identify the particular sub-array (or tile) that should receive a force-quit strobe.

The global wires emanating from P-Shim 1 are labeled as 11, 12, 13, and 14. The global wires emanating from P-Shim 2 are labeled 21, 22, 23, and 24. Those from P-Shim 3 are labeled 31, 32, 33, and 34. And those from P-Shim 4 are labeled 41, 42, 43, 44. So, in all, 16 global wires are used to convey force-quit command strobes from any of four P-Shims to any of four MAGCUs in the example shown. Other implementations can have any number of P-Shims and any number of MAGCUs and in some cases, some P-Shims may not include a sequence detector and may not be able to initiate a force-quit command.

In operation, runtime program 202 sends a tile-specific force-quit initiation 810 (e.g. a bit mask or a bit sequence) of PCIe writes over one of the PCIe links 802, 804, 806, or 808 (or interface buses) to a register (e.g., a dedicated force-quit bit mask register or the PCIe MSI-X Message Control register) that is part of an address space of its respective PCIe interface.

Figure 9:
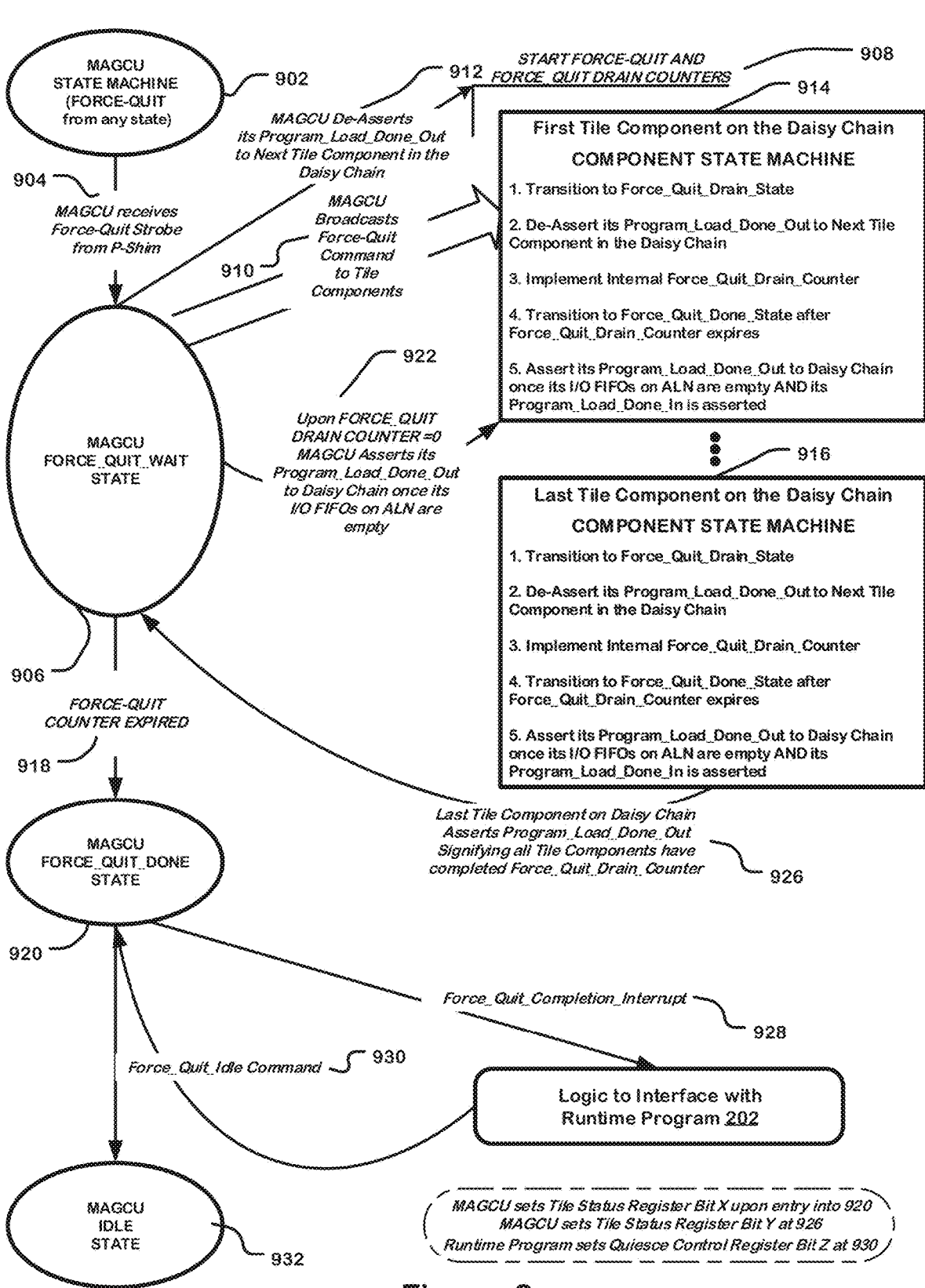
FIG. 9 illustrates a MAGCU state machine for executing a force-quit command.
Figure 10:
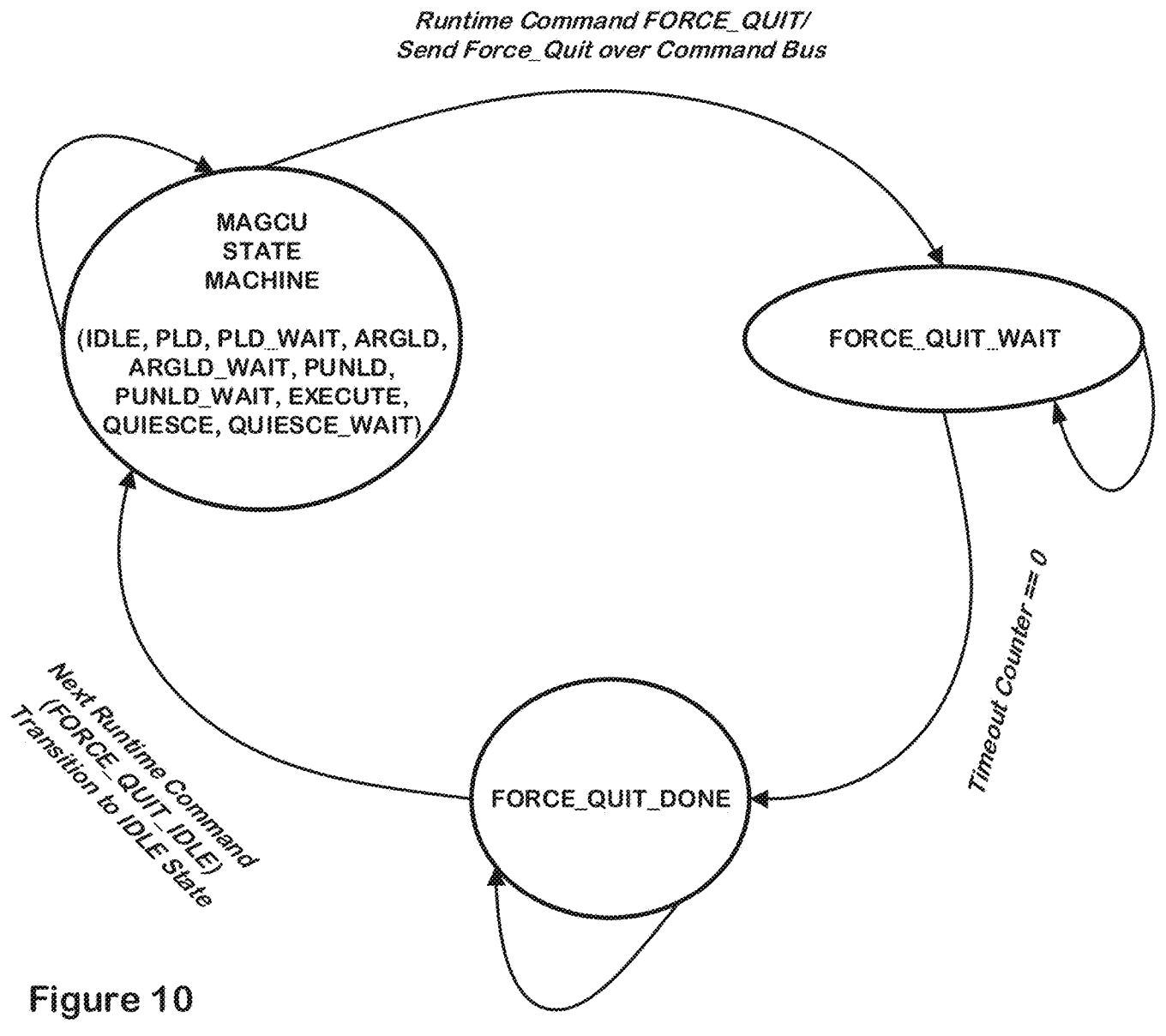

Continuing operation, the force-quit detector of whichever P-Shim was written by runtime program 202 detects that a force-quit was requested. In response, the P-Shim containing the force-quit detector generates and sends a force-quit command strobe to the force-quit controller of the tile that was identified by the force-quit bit sequence over a global wire (11-14, 21-24, 31-34, 41-44) of the top level network. FIG. 9 and FIG. 10 illustrate and describe the response by the MAGCU of the force-quit controller that received the force-quit command strobe.

Other implementations may use alternative mechanisms to initiate a force-quit sequence. One alternative implementation may define a unique address for each sub-array in the reconfigurable processor that can be written to send a force-quit command to the respective sub-array. Any technique can be used to send the force-quit command for one or more sub-arrays from the runtime program 202 to the reconfigurable processor and still be within the scope of this disclosure.

FIG. 9 illustrates an example MAGCU state machine for executing a force-quit command. An advantageous aspect of the disclosed force-quit implementations is that MAGCU can begin executing the force-quit command irrespective of the current state it happens to occupy. Operation of the MAGCU state machine begins at 902, with the MAGCU state machine being in any state, including the idle state, the program load state, the program load wait state, the argument load state, the argument load wait state, the program unload state, the program unload wait state, the execute state, the quiesce state, or the quiesce wait state.

At 904, MAGCU receives a force-quit strobe from an interface agent (or P-Shim). As illustrated and described with respect to FIG. 8, MAGCU's force-quit controller can receive a force-quit strobe from a P-Shim (a PCIe interface agent) via a global wire over the top level network. The force-quit controller responds to the force-quit strobe by transitioning the MAGCU state machine to the force-quit wait state 906.

At 906, MAGCU performs three actions: 908, 910, and 912 upon entering the force-quit wait state. At 908. MAGCU starts a force-quit counter, optionally using the value in the software-programmable force-quit timeout register. As described with respect to FIG. 15, in some implementations the force-quit counter will be set to the larger of 8192 and a bit value in bits A:0 of the force-quit timeout register, so the force-quit counter will count at least 8192cycles. The counter can either count from 0 to the counter value, or from the counter value to 0, as a matter of design choice. The force-quit feature can also be disabled by setting bit [A+1] of the force-quit timeout register in some implementations. It also starts a force-quit drain counter that is set to a lower value than the force-quit counter but is large enough to allow enough time for the MAGCU input and output FIFOs to empty.

At 912, also upon entering the force-quit wait state, MAGCU deasserts its PROGRAM_LOAD_DONE_OUT which is fed into the PROGRAM_LOAD_DONE_IN of first processing unit on the daisy chained completion bus 1291 (FIG. 12), which is an example of an interconnect topology. The configurable units in the sub-array each have a PROGRAM_LOAD_DONE_IN that is coupled to a PRO-GRAM_LOAD_DONE_OUT of a previous configurable unit in the daisy chain. And the PROGRAM_LOAD_DO-NE_OUT of that configurable unit is coupled to a PRO-GRAM_LOAD_DONE IN of the next configurable unit in the daisy chain. The MAGCU's PROGRAM_LOAD_DO-NE_OUT can be considered the output of the first element of the daisy chain and the MAGCU's PROGRAM_LOAD_DONE_IN is the input of the last element of the daisy chain. Other topologies can be used to achieve a similar result, such as a multi-input AND gate to generate an AND function of all of the PROGRAM_LOAD DONE-_OUT signals from all of the configurable units in a sub-array which is than fed back into the PROGRAM_LOAD DONE_IN of the MAGCU.

At 910, further upon entry into force-quit-wait state, the MAGCU, assisted by its force-quit controller, broadcasts a force-quit command, a so-called force-quit control signal, to all of the configurable units of its tile. The force-quit command will cause the configurable units to reset by executing the component force-quit process of FIG. 14. Receipt of the force-quit command from MAGCU will cause the components to reset their internal states, reset their credit counters, empty their input and output IO buffers on the ALN, flush any internal data processing pipelines, and take any additional steps as illustrated and discussed with respect to FIG. 14. In addition, slave AGCUs that receive the force-quit command will complete any outstanding TLN transactions they may have had. In some implementations, the components will have at least 8192 cycles to complete the force-quit process of FIG. 14, since MAGCU's force-quit-counter will not expire before 8192 cycles pass.

Also, while in the force-quit-wait state, MAGCU applies special treatment to register read and write requests received from the runtime program. Read and write transactions to registers local to the MAGCU on which the force-quit controller resides are serviced as normal. MAGCU will cause completion of any outstanding transactions on the TLN, and the slave AGCUs are also caused to complete their outstanding transactions on the TLN. This provides the benefit of allowing the runtime program to monitor MAGCU status registers to monitor the status of execution of the force-quit command. Register write requests to registers remote to MAGCU, on an array component, for example, are dropped. For register read requests to registers remote to MAGCU, MAGCU returns 0. No errors will be signaled for register accesses remote to the AGCU. Disabling read and write requests to remote registers is expected to enhance their likelihood of achieving reset.

The MAGCU continues to hold its PROGRAM_LOAD_DONE OUT in the deasserted state until the force-quit drain counter decrements to zero. Once the force-quit drain counter hits zero at 922, the MAGCU asserts it PROGRAM_LOAD DONE_OUT if its input and output FIFOs are empty. Note that the MAGCU stays in the force-quit-wait state after the force-quit drain counter is decremented to zero.

The illustration at 914, as replicated in Table 2, shows actions taken by the first configurable unit to receive the force-quit command. That component will apply the component state machine of FIG. 14. At 914, the first component transitions to force-quit drain and starts a force-quit-drain counter. When the counter expires, the component transitions to force-quit-done, and asserts its program-load-done output onto the program load done daisy chain (or interconnect topology) if its IO FIFOs on ALN are empty and program-load-done-in is asserted. An objective of performing the component force-quit process of FIG. 14 is to reset the component, at least by resetting internal states, counters, or credits, and flushing input, output, internal buffers.

TABLE 2

FIRST Component's Force-Quit Actions
Component State Machine

1. Transition to Force-Quit-Drain State
2. De-Assert PROGRAM_LOAD_DONE_OUT to Daisy-Chain
3. Implement Internal Force-Quit-Drain-Counter TABLE 2-continued FIRST Component's Force-Quit Actions
Component State Machine 4. Transition to Force-Quit-Done when counter expires
5. Assert PROGRAM_LOAD_DONE_OUT onto daisy chain once IO
FIFOs
ALN FIFOs are empty and program-load-done-in is asserted The illustration at 916 as replicated in Table 3 shows actions taken by the last configurable unit to receive the force-quit command. Like the first component's actions shown at 914 and Table 2, the last component will apply the component state machine of FIG. 14. At 916 and as shown in Table 3, the last component transitions to force-quit drain state and starts a force-quit-drain counter. Then when the counter expires, the component transitions to force-quit done state and asserts its program-load-done output onto the daisy chain (or interconnect topology) if its IO FIFOs on ALN are empty and program-load-done-in is asserted. As with the first configurable unit, a goal of executing the component force-quit process on the last unit is to reset the configurable unit.

TABLE 3

LAST Component's Force-Quit Actions
Component State Machine

1. Transition to force-quit-drain state
2. De-Assert program-load-done-out to Next Component in the Daisy Chain
3. Implement Internal force-quit-drain timer
4. Transition to force-quit-done after force-quit-drain counter expires.
5. Assert program-load-done-out onto daisy chain once IO FIFOs
ALN FIFOs are empty and program-load-done-in is asserted In operation, the configurable units are expected to be able to achieve reset. In some implementations, MAGCU will stay in force-quit wait state and allow the configurable units to reset for at least 8192 cycles. The configurable units' force-quit-drain counter in some implementations is set to 1024 cycles for PMU, PCU, and Switch components, and to 4096 cycles for slave AGCU components. So, the tile components may have more than enough time to reset themselves.

While in the force-quit wait state, the MAGCU samples its PROGRAM_LOAD_DONE IN coupled to the PRO-GRAM_LOAD_DONE_OUT of the last configurable unit in the daisy chain (other than the MAGCU which is both the first and last element in the daisy chain), which, if asserted, indicates that every component on the daisy chain (or interconnect topology) has completed force-quit. MAGCU continues to repetitively sample the daisy chained completion input while in the force-quit wait state 906. MAGCU can modify the frequency of sampling: sampling more frequently when traffic is heavy and sampling less frequently otherwise. The sampling rate is an implementation design choice. At 926, once the daisy chained PROGRAM_LOAD_DONE_OUT is asserted by the last component in the daisy chain, MAGCU sets bit Y of the tile status register (FIG. 16).

At 918, upon expiration of the force-quit counter, MAGCU's force-quit controller transitions the MAGCU state machine to force-quit done state 920, upon which MAGCU performs actions, as described in the next four paragraphs.

MAGCU sets bit X of the tile status register (FIG. 16) once it enters the force-quit done state 920. The input and output FIFOs are likely to be empty when MAGCU enters the force-quit done state because they were draining during the force-quit wait state and the force-quit drain counter, which is smaller than the force-quit counter used to transition to the force-quit wait state, is set to a large-enough value to allow the FIFOs to fully drain. The runtime program can monitor bits X and Y of the tile status register to gauge the progress of execution of the force-quit command. The force-quit counter for the MAGCU can be set to have a larger value than the force-quit drain counter of the MAGCU and the propagation delay of the daisy chain to ensure that the Y bit of the tile status register is set before the MAGCU enters the force-quit done state, as long as there are no error conditions.

At 928, MAGCU can in some cases generate a force-quit completion interrupt to the runtime program via the interface agent (or P-Shim).

In some implementations, the MAGCU implements a force-quit done counter to manage a situation when the asserted program-load-done-in never arrives. If the counter exceeds a force-quit done timeout value, MAGCU determines that an asserted input from the daisy chain is not expected to arrive. In this case, MAGCU generates the force-quit completion interrupt, only setting bit X of the tile status register, and ignores any subsequent transition on the program-load-done-in that would otherwise set bit Y.

The MAGCU state machine remains in the force-quit done state 920 until the runtime program sets bit Z of the Quiesce Control Register (FIG. 17) at 930, which will serve as an idle command, causing MAGCU to transition from force-quit-done 920 to MAGCU Idle state 932.

FIG. 10 illustrates the MAGCU state machine for executing a force-quit command as shown in FIG. 9 using a different representation. The state machine includes two states, force-quit wait and force-quit done, that are used during processing of force-quit commands.

In operation, the MAGCU force-quit process can be initiated regardless of the current state of the MAGCU state machine. The current state of the MAGCU state machine when a force-quit command arrives could be an Idle state, a program load state, a program load wait state, an argument load state, an argument load wait state, a program unload state, a program unload wait state, an execute state, a quiesce state, and quiesce-wait state. The ability to start in any state provides an advantage of getting started on the force-quit without waiting to exit some other state.

Starting in any state, then, the MAGCU state machine transitions to the force-quit wait state in response to receiving a force-quit command strobe over a global wire on the top level network from a P-shim that detected a tile-specific force-quit bit sequence sent by the host processor on a PCIe bus (as illustrated and described with respect to FIG. 6-FIG. 8).

While in the force-quit wait state, MAGCU will attempt to reset the configurable units in its tile and clear their internal states by broadcasting a force-quit to all of the tile's configurable units over the command bus of the array-level network. Configurable units will respond to the force-quit at least by resetting their internal states, resetting their credit counters, draining their execution pipelines, draining input and output FIFOs, and taking any additional steps as illustrated and described with respect to FIG. 14. Slave AGCUs that receive the force-quit will also complete their outstanding transactions on the TLN. Also, while in the force-quit wait state, MAGCU will at regular intervals decrement a force-quit counter that was initialized to a value in a force-quit timeout register (as illustrated and described in FIG.

15). While MAGCU is in the force-quit wait state, the tile components will be resetting their internal states, resetting credit counters, clearing input and output FIFOs, as illustrated and described at 914 (FIG. 9) and FIG. 14.

When the force-quit counter reaches 0, the MAGCU state machine transitions to force-quit done. While in force-quit done, MAGCU is configured to perform several actions, as illustrated and described in FIG. 9 to determine the status of the tile and issue a force-quit done interrupt to the runtime program.

The MAGCU state machine transitions from force-quit done to MAGCU Idle state in response to a force-quit idle command, i.e., runtime program setting bit Z of the quiesce control register as illustrated and described with respect to FIG. 17.

Figure 11:
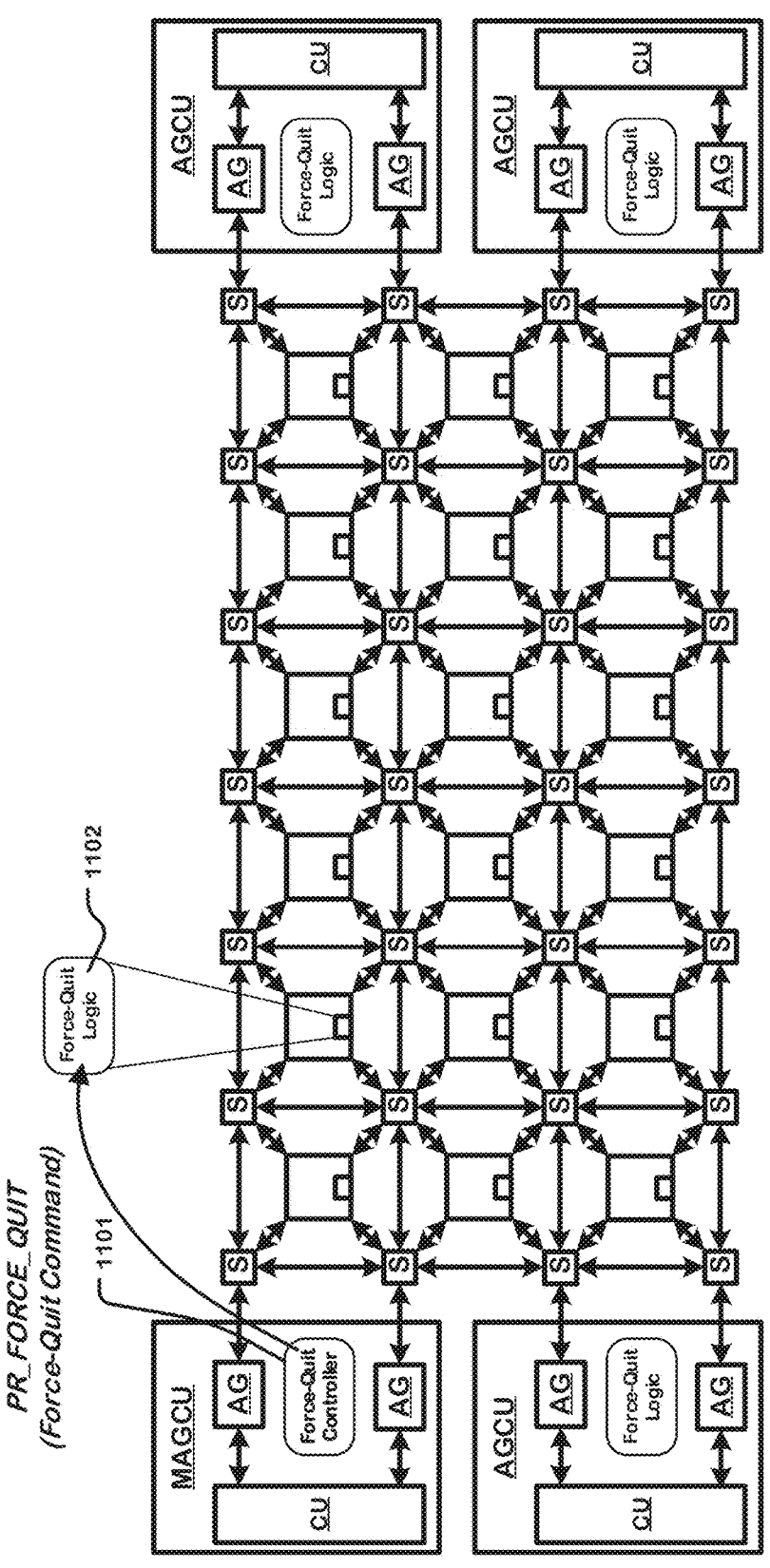
FIG. 11 illustrates force-quit logic in a sub-array (or tile) of configurable units.

FIG. 11 illustrates force-quit logic in a sub-array (or tile) of configurable units. As shown, the tile represents a sub-array or partition of the array of configurable units 130 (FIG. 1) making up the reconfigurable processor. The tile may include several types of configurable units, such as AGCUs, PMUs, PCUs, switches, memory units, and/or compute units, all of which are described with reference to FIG. 3. The illustrated tile contains a plurality of address generating and coalescing units (AGCUs), one of which is a master AGCU (MAGCU) and the other three are slave AGCUs. The ALN includes one or more kinds of physical data buses, for example a chunk-level vector bus (e.g., 512 bits of data), a word-level scalar bus (e.g., 32 bits of data), and a control bus.

Unlike FIG. 3, however, FIG. 11 shows the force-quit controller 1101. As shown, the master AGCU includes a force-quit controller that implements the state machines of FIG. 9 and FIG. 10 and broadcasts a force-quit command to attempt to reset all of the configurable units in its tile and reset their internal states.

Also, unlike FIG. 3, FIG. 11 shows force-quit logic included in all configurable units in the ALN, as well as in the three slave AGCUs. In operation, the force-quit logic in the configurable units and slave AGCUs attempts to reset the configurable unit and reset its internal states in response to a force-quit command by implementing the component state machine illustrated and described with respect to FIG. 14.

Figure 12:
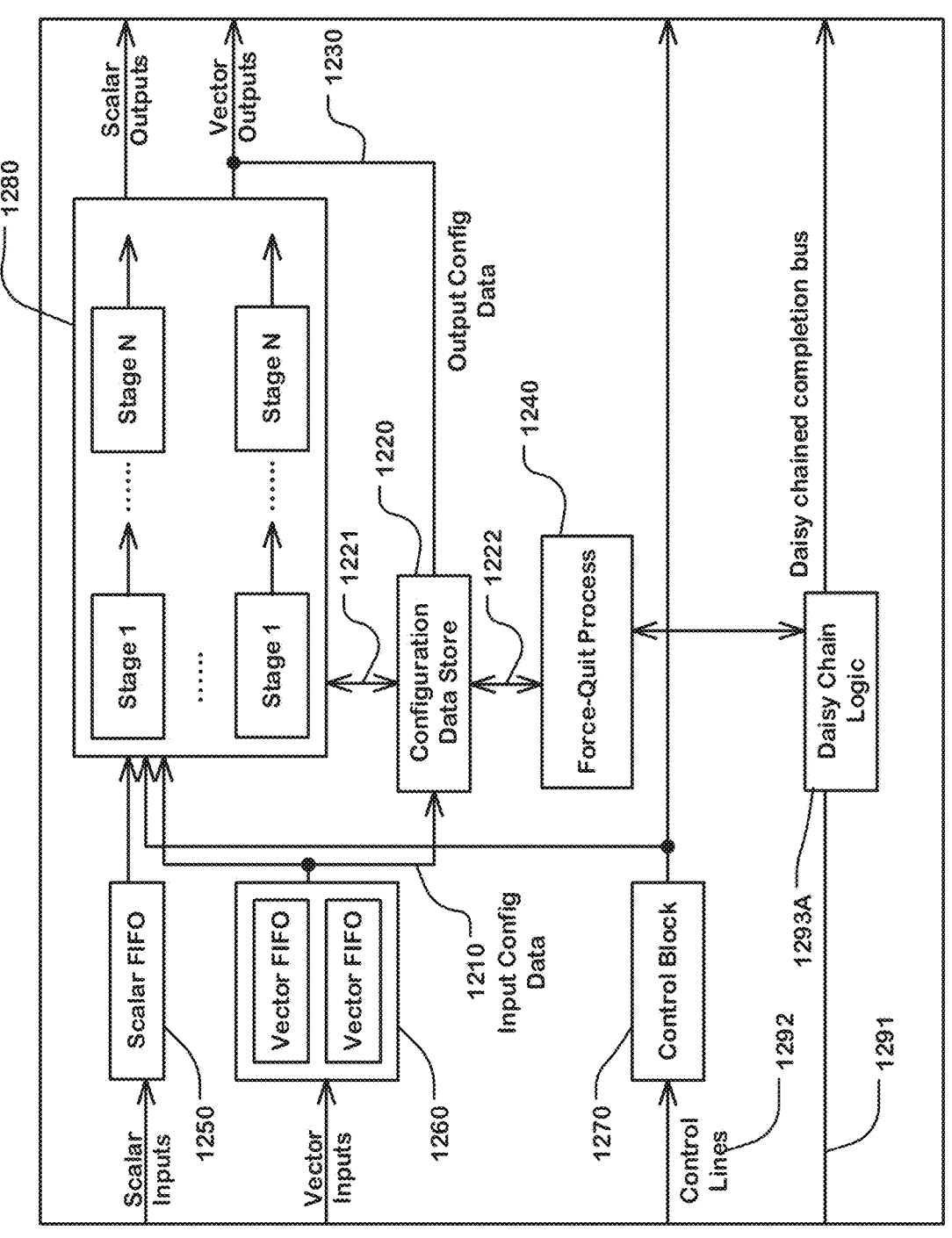
FIG. 12 illustrates an example configurable unit including force-quit logic.

FIG. 12 illustrates an example configurable unit including force-quit logic. The figure is a block diagram illustrating an example pattern compute unit (PCU), but the force-quit process 1240 and daisy chain logic could be applied to any type of configurable unit, including a pattern memory unit (PMU), a fused compute and memory unit (FCMU), a switch, a MAGCU (in which case force-quit process logic 1240 assists in implementing the MAGCU state machine of FIG. 9 and FIG. 10) or a slave AGCU (in which case force-quit process logic 1240 assists in implementing the component state machine of FIG. 14). If the illustrated configurable unit is a PCU, PMU, FCMU, or switch, then force-quit process logic 1240 assists in implementing the component state machine of FIG. 14. A configurable unit can interface with the array-level network. For example, scalar inputs can be stored in scalar FIFO 1250 and fed into execution pipelines 1280. Vector inputs can be stored in vector FIFO 1260 and fed to execution pipelines 1280 and configuration data store 1220. Control inputs can be inputted into control block 1270.

Configurable units in the array of configurable units 130 each include configuration data stores 1220 (e.g., serial chains) to store unit files comprising a plurality of chunks (or sub-files of other sizes) of configuration data particular to the corresponding configurable units. Configuration data store 1220 can receive inputs from input config data 1210 and can output configuration data using output config data 1230.

Vector inputs can be stored in vector FIFO 1260, and then be transferred as input config data 1210 to the configuration data store 1220. Output config data 1230 can be unloaded from the configuration data store 1220 using the vector outputs. Vector IOs can be used to communicate chunks of data (e.g., 512 bits), in cases such as receiving configuration data in a unit configuration load process (also referred to as a program load process) and transmitting and receiving data during operation after configuration across a long pipeline between multiple PCUs.

In some implementations, Control Lines 1292 can be used by a MAGCU to broadcast a force-quit command to all of the configurable units in its tile, as in step 910 of FIG. 9. or a force-quit command during a force-quit process (as described with respect to FIG. 14). Daisy chain logic 1293A can also drive the daisy chained completion bus 1291 (a so-called interconnect topology), which, during force-quit, is used to carry a force-quit done signal, as further described with respect to FIG. 13.

Configurable units in the array of configurable units 130 each include force-quit process logic 1240 connected to the configuration data store 1220 via line 1222, to execute a force-quit process as illustrated and described with respect to FIG. 14.

During the force-quit process being executed by a configurable unit in a tile, as illustrated and described with respect to FIG. 14, the configurable units will attempt to empty their input and output FIFOs, drain internal pipelines operations, reset credits, and reset their internal states so as to achieve a reset state. During execution of force-quit, then, scalar FIFO 1250 and vector FIFO 1260 will be drained at a maximum rate, and the data will be dropped rather than being fed into execution pipeline 1280. Back-pressure will be disabled, and credits will be reset, allowing inputs to arrive without impediment as they will be drained at maximum rate. During force-quit, output FIFOs will be allowed to drain onto the ALN, since they will be dropped by the recipient, and no new entries will be loaded into the output FIFOs. Control inputs will be ignored during force-quit, and control outputs will be disabled. Configurable units' handling of the force-quit process is illustrated and described with respect to FIG. 14.

Vector inputs may be buffered using a vector FIFO in a vector FIFO 1260. Scalar inputs may be buffered using scalar FIFO 1250. Using input FIFOs decouples timing between data producers and consumers and simplifies inter-configurable-unit control logic by making it robust to input delay mismatches.

During execution of a force-quit command, the tile (or sub-array of array of configurable units 130) uses daisy chained completion bus 1292 to indicate when a force quit command is completed. As shown in the example of FIG. 12, a daisy chained completion bus 1291 and a daisy chained command bus 1292 are connected to daisy chain logic 1293A, which communicates with the force-quit process logic 1240. The daisy chained completion bus is further described below. Other topologies for the command and completion buses are clearly possible but not described here.

A configurable unit, such as a PCU, may include multiple reconfigurable data paths in execution pipelines 1280. A Datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each Datapath in the configurable unit. The configuration serial chain in the configuration data store 1220 is connected to the multiple data paths in execution pipelines 1280 via lines 1221.

A Pattern Memory Unit (e.g., PMU) can contain scratch-pad memory coupled with a reconfigurable scalar Datapath intended for address calculation, along with the bus inter-faces used in the PCU. PMUs can be used to distribute on-chip memory throughout the array of reconfigurable units. In some implementations, address calculation within the memory in the PMUs is performed on the PMU Data-path, while the core computation is performed within the PCU.

Figure 13:
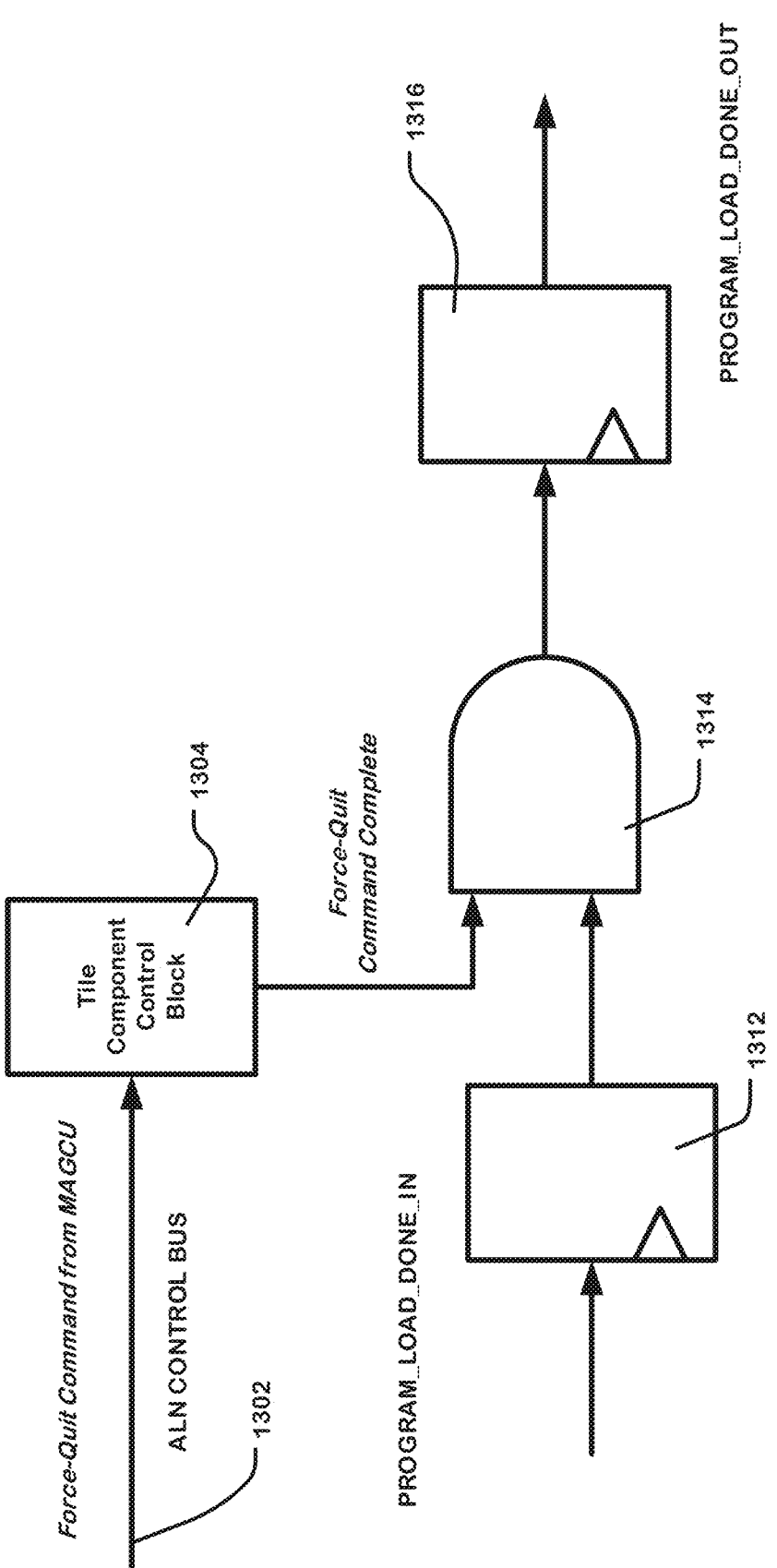
FIG. 13 shows logic useable by a configurable unit to drive its program-load-done output.

FIG. 13 shows logic useable by a configurable unit to receive PROGRAM_LOAD_DONE_IN and drive its PRO-GRAM_LOAD_DONE_OUT in a daisy chain interconnect topology. As shown, tile component control block 1304 receives array-level network control bus 1302, which can be used to carry a force-quit command which will come from the tile's MAGCU to initiate the force-quit process. Program load done in register 1312 (or latch or flip-flop) will receive the PROGRAM_LOAD_DONE_OUT of an immediately prior configurable unit in the program done daisy-chain (or interconnect topology) through the configurable unit's PRO-GRAM_LOAD_DONE_IN input.

In operation, a force-quit command will arrive from MAGCU and initiate the tile's force-quit process as con-trolled by the tile component control block 1304. At some point, the PROGRAM_LOAD_DONE_IN from the previ-ous configurable unit will arrive and be stored in register 1312. Once the force-quit command complete outputted from tile component control block 1304 is asserted and register 1312 is asserted, AND gate 1314 will assert the input of program load done out register 1316 (or latch or flip-flop), which will assert the PROGRAM_LOAD_DO-NE_OUT of the configurable unit which is then sent to the PROGRAM_LOAD_DONE_IN of the next configurable unit in the daisy chain.

FIG. 14 illustrates a configurable unit state machine for executing a force-quit command. An advantageous aspect of the disclosed force-quit implementations is that the config-urable units (or processing units) can be caused to begin executing the force-quit command irrespective of their cur-rent state, which could be idle, configure (or program load), argument load, checkpoint, execute, or quiesce. The ability to start in any state provides an advantage of starting force-quit without waiting to exit some other state.

In operation, configurable units begin executing force-quit at 1400, which is whatever state they were in before receiving the force-quit command. In response to receiving the force-quit command broadcasted by MAGCU to all configurable units in its tile, each configurable unit transi-tions to force-quit-drain 1402 and initializes a force-quit-drain-timer. Each configurable unit also de-asserts its pro-gram-load-done-out signal onto the daisy chained completion bus 1291 (FIG. 12) (the interconnect topology) upon entry into force-quit-drain 1402.

While in force-quit-drain 1402, the configurable unit decrements the force-quit drain-timer on every cycle. In some implementations, the counter starts at zero and counts upwards. Upon expiration of the force-quit-drain-timer, each configurable unit transitions to force quit-done 1404. and stays there until it receives an idle command.

While in force-quit-drain 1402 or force-quit-done 1404, each configurable unit performs the actions as listed in Table 4. The actions listed in Table 4 are also performed by slave AGCUs, which include force-quit logic, as shown in FIG. 11. In addition, slave AGCUs complete any outstanding transactions on the TLN.

TABLE 4

| Actions performed while in force-quit-drain or force-quit--done |
| --- |
| Disable all control outputs, and ignore all control inputs. |
| Reset all E2E (end-to-end) credits. |
| Accept data into input FIFOs, but deque and drop data at maximum rate. |
| Do not propagate input data to internal pipelines. |
| Disable back-pressure, and FIFO dependency. |
| Release FIFO credits when input FIFOs are dequeued. |
| Drain existing pipeline operations; do not allocate new data in output FIFOs. |
| PCU also drains broadcast pipeline. |
| Dequeue all internal FIFOs until empty. |
| Reset all internal state machines. |
| Reset all counters, sticky bits, and scoreboards. |
| Ignore all control inputs; Disable control outputs. |
| Drain output FIFOs as normal since recipient will drop data from input FIFO. |
| Drop incoming register access requests, do not launch any register transactions. |

FIG. 15 illustrates a format of a force-quit timeout reg-ister. This is a runtime programmed register in Master AGCU which holds a timeout counter value and an Enable bit used by the force-quit process. The fields of the register are shown in FIG. 15 and in Table 5. In some implementa-tions, the force-quit timeout register is a 33-bit register.

TABLE 5

| Force-quit timeout register | | |
| --- | --- | --- |
| Bits | Field | Description |
| A:0 | Timeout Value | Number of cycles MAGCU waits before signaling Force-Quit Done (Minimum K cycles) |
| A + 1 | Force-quit Disable | Disables Force-Quit Feature |

Once a force-quit command is issued to MAGCU, a counter increments every cycle until it reaches the force-quit timeout value specified in this register or 8192, whichever is larger. When the counter reaches the value, the following events occur:

Master AGCU transitions to force-quit done state.

MAGCU signals an interrupt to runtime indicating force-quit completion.

A single MSI-X interrupt #27 is used by all 4 tiles to signal force-quit completion.

MAGCU will update Tile Status register

By default, force-quit feature may be enabled in some implementations. Bit A+1 of the force-quit timeout CSR can be SET to disable the force-quit function in some imple-mentations.

FIG. 16 illustrates a format of an example tile status register. FIG. 16 shows bits in tile status register which are related to force-quit implementation. The contents of the tile status register are also shown in Table 6. The runtime program can check the X and Y bits to learn force-quit status. A successful force-quit may be indicated by both the X and Y bits being set. In some implementations, bit X gets set when MAGCU transitions to force-quit done state, and bit Y gets set if all components on sub-array indicate successful force-quit completed. Components indicate suc-cessful force-quit done by asserting the daisy chained pro-gram-load-done signal. Bits N:M reflect the state of MAGCU state machine. If Bit X is set but Bit Y is not set, at least one configurable unit in the sub-array was unable to complete the force-quit operation. In such cases, the runtime software may need to take more drastic action to recover the sub-array, such as performing a full reset on the subsystem (or full system) or notifying the operator that some action is required, such as performing a full diagnostic and/or repair of the system.

TABLE 6

Tile Status Register

| Bits | Field | Description |
|------|-------|-------------|
| X | Force-quit Complete | Set when Force Quit is complete |
| Y | Force-quit Components' Status | Set if all Tile components successfully complete Force-Quit |
| N:M | Program state | Reflects the state of the following MAGCU state machines: Wait for Force Quit to complete Force Quit Done |

FIG. 17 illustrates a format of a quiesce control register. The contents of the quiesce control register are also shown in Table 7.

TABLE 7

Quiesce Control Register

| Bits | Field | Description |
|------|-------|-------------|
| Z | Force-quit IDLE | Transition from FORCE_QUIT_DONE state to IDLE state |

Bit Z of the Quiesce Control register can be used by the runtime program to initiate an idle command on the sub-array. The runtime program may set bit Z in response to reading bits X and Y of the Tile Status Register and seeing that the force-quit was successfully completed. Setting the Z bit of the Quiesce Control Register causes the MAGCU to transition from the force-quit done state to the idle state.

Clauses

The technology disclosed, in particularly, the clauses disclosed in this section, can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections-these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

Clause Set 1

Clause 1. A reconfigurable processor, comprising: an array of configurable units on an integrated circuit substrate, the array including a plurality of sub-arrays of configurable units; and a force-quit controller on a particular sub-array in the plurality of sub-arrays, configurable to receive a force-quit command, and generate force-quit control signals that reset configurable units in the particular sub-array.

Clause 2. The reconfigurable processor of clause 1, further comprising an interface agent coupled to the force-quit controller and configured to send the force-quit command to the force-quit controller.

Clause 3. The reconfigurable processor of clause 2, wherein the interface agent communicates data between the array and an interface bus over a top level network, and wherein the interface bus is connected to a host processor via an interface link.

Clause 4. The reconfigurable processor of clause 3, wherein the force-quit control signals cause a particular configurable unit of the particular sub-array that includes the force-quit controller to complete outstanding transactions on the top level network.

Clause 5. The reconfigurable processor of clause 3, wherein the interface agent is further coupled to an interface bus and configured to receive a force-quit message written to a register in an address space of the interface bus by a runtime program running on a host processor, and send the force-quit command to the force-quit controller in response.

Clause 6. The reconfigurable processor of clause 5, wherein the register is located in a configuration address space of the interface bus.

Clause 7. The reconfigurable processor of clause 5, wherein the force-quit message comprises a sub-array-specific, force-quit bit sequence written to the register.

Clause 8. The reconfigurable processor of clause 7, wherein the sub-array-specific, force-quit bit sequence has a function header, a function select, and a sub-array-specific function argument.

Clause 9. The reconfigurable processor of clause 8, wherein the sub-array-specific function argument makes the sub-array-specific, force-quit bit sequence specific to the particular sub-array.

Clause 10. The reconfigurable processor of clause 7, wherein the register is a message control register in a configuration address space of the interface bus.

Clause 11. The reconfigurable processor of clause 7, wherein the interface agent includes a sequence detector that detects the sub-array-specific, force-quit bit sequence from the configuration register.

Clause 12. The reconfigurable processor of clause 11, wherein the interface agent generates the force-quit command as a strobe signal in response to the sequence detector detecting the sub-array-specific, force-quit bit sequence.

Clause 13. The reconfigurable processor of clause 12, wherein the interface agent sends the force-quit command to the force-quit controller via a global wire.

Clause 14. The reconfigurable processor of clause 13, wherein a transition on the global wire from a high signal level to a low signal level or from the low signal level to the high signal level indicates transmission of the force-quit command to the force-quit controller.

Clause 15. The reconfigurable processor of clause 5, wherein the force-quit message identifies the particular sub-array, and wherein the interface agent generates the force-quit command as a strobe signal in response to the data.

Clause 16. The reconfigurable processor of clause 5, wherein the force-quit message is a mask.

Clause 17. The reconfigurable processor of clause 5, wherein the force-quie message is a mask having one bit for each sub-array in the plurality of sub-arrays.

Clause 18. The reconfigurable processor of clause 1, wherein the force-quit controller is further configurable to broadcast the force-quit control signals to the configurable units in the particular sub-array over an array level network connected to the configurable units in the particular sub-array.

Clause 19. The reconfigurable processor of clause 1, wherein the force-quit control signals cause the configurable units in the particular sub-array to reset their internal states.

Clause 20. The reconfigurable processor of clause 1, wherein the force-quit control signals cause the configurable units in the particular sub-array to empty their input buffers and output buffers.

Clause 21. The reconfigurable processor of clause 1, wherein each sub-array in the plurality of sub-arrays has a plurality of address generation and coalescing units (AGCUs), including a master AGCU and one or more slave AGCUs.

Clause 22. The reconfigurable processor of clause 21, wherein a particular master AGCU of the particular sub-array includes the force-quit controller.

Clause 23. The reconfigurable processor of clause 22, wherein the force-quit control signals cause the particular master AGCU to empty its input buffers and output buffers.

Clause 24. The reconfigurable processor of clause 22, wherein the configurable units in the particular sub-array are connected in an interconnect topology.

Clause 25. The reconfigurable processor of clause 24, wherein the configurable units are further coupled to an array level network in addition to the interconnect topology and the configurable units include the particular master AGCU, a set of slave AGCUs, pattern memory units (PMUs), pattern compute units (PCUs), and switches.

Clause 26. The reconfigurable processor of clause 25, wherein the force-quit controller is further configurable to execute a force-quit process for the particular sub-array, including: transitioning the particular master AGCU from a current state to a force-quit wait state in response to receiving the force-quit command; while in the force-quit wait state: starting a force-quit counter, broadcasting the force-quit control signals to the configurable units in the particular sub-array, and de-asserting an output port of the particular master AGCU on the interconnect topology; upon expiration of the force-quit counter, transitioning the particular master AGCU from the force-quit wait state to a force-quit done state; while in the force-quit done state: asserting the output port of the particular master AGCU on the interconnect topology once its input buffers and output buffers on the array level network are empty, and sampling an input port of the particular master AGCU on the interconnect topology, and detecting that a last configurable unit on the interconnect topology has asserted its output port; sending a force-quit completion interrupt to a runtime program running on a host processor; and transitioning the particular master AGCU from the force-quit done state to an idle state in response to receiving an idle command from the runtime program.

Clause 27. The reconfigurable processor of clause 26, wherein the current state is one of the idle state, a program load state, a program load wait state, an argument load state, an argument load wait state, a program unload state, a program unload wait state, an execute state, a quiesce state, or a quiesce wait state.

Clause 28. The reconfigurable processor of clause 21, wherein respective sub-arrays in the plurality of sub-arrays have respective master AGCUs that include respective force-quit controllers.

Clause 29. The reconfigurable processor of clause 28, wherein the respective force-quit controllers are configurable to receive force-quit commands from a plurality of interface agents.

Clause 30. The reconfigurable processor of clause 29, wherein a runtime program running on a host processor is configurable to generate respective sub-array-specific, force-quit bit sequences to send respective force-quit commands for the respective sub-arrays.

Clause 31. The reconfigurable processor of clause 30, wherein the runtime program is further configurable to write the respective sub-array-specific, force-quit bit sequences to configuration registers in configuration spaces of interface buses communicating with the plurality of interface agents.

Clause 32. The reconfigurable processor of clause 31, wherein sequence detectors of the plurality of interface agents are configurable to detect the respective sub-array-specific, force-quit bit sequences written to corresponding ones of the configuration registers.

Clause 33. The reconfigurable processor of clause 32, wherein the plurality of interface agents is configurable to communicate with the respective force-quit controllers via corresponding sets of global wires.

Clause 34. The reconfigurable processor of clause 33, wherein the plurality of interface agents is configurable to generate the force-quit commands as strobe signals in response to the sequence detectors detecting the respective sub-array-specific, force-quit bit sequences.

Clause 35. The reconfigurable processor of clause 34, wherein the plurality of interface agents is configurable to send the force-quit commands to the respective force-quit controllers via the corresponding sets of global wires.

Clause 36. The reconfigurable processor of clause 35, wherein a transition on a global wire in the corresponding sets of global wires indicates transmission of a force-quit command to a corresponding force-quit controller from a corresponding interface agent.

Clause 37. The reconfigurable processor of clause 36, wherein interface agents in the plurality of interface agents are configurable to connect to the host processor, to other array of configurable units, to a switching fabric, and to other interface devices.

Clause 38. The reconfigurable processor of clause 1, wherein at least one configurable unit in the particular sub-array is unresponsive to communication from a host processor.

Clause 39. The reconfigurable processor of clause 1, wherein the particular sub-array is unresponsive while executing a current program.

Clause 40. The reconfigurable processor of clause 39, wherein the force-quit control signals cause the configurable units in the particular sub-array to drain out data for the current program.

Clause 41. The reconfigurable processor of clause 39, wherein the force-quit control signals cause the configurable units in the particular sub-array to be available for execution of a next program.

Clause 42. The reconfigurable processor of clause 39, wherein the particular sub-array is unresponsive after being configured to execute the current program but prior to executing the current program.

Clause 43. The reconfigurable processor of clause 39, wherein the particular sub-array is unresponsive while being configured to execute the current program but prior to executing the current program.

Clause 44. The reconfigurable processor of clause 41, wherein the particular sub-array is unresponsive after starting the current program but prior to being configured to execute the next program.

Clause 45. A processing system, comprising: an array of processing units; force-quit logics coupled to the processing units, each force-quit logic configurable to: receive a force-quit control signal, and reset an associated processing unit in response to the force-quit control signal; and the force-quit logics connected in an interconnect topology among the processing units, such that each force-quit logic is further configurable, in response to receiving the force-quit control signal, to: generate a force-quit done signal to indicate completion of the reset of the associated processing unit, and forward the force-quit done signal on the interconnect topology once a force-quit done signal from a preceding processing unit's force-quit logic on the interconnect topology is received.

Clause 46. The processing system of clause 45, further comprising a force-quit controller configurable to broadcast force-quit control signals to the processing units, and to receive a force-quit done signal from a last processing unit's force-quit logic on the interconnect topology.

Clause 47. The processing system of clause 45, wherein each force-quit logic is further configurable to execute a force-quit process for the associated processing unit, including: transitioning the associated processing unit from a current state to a force-quit drain state in response to receiving the force-quit control signal; while in the force-quit drain state: de-asserting the force-quit done signal to the interconnect topology; and starting a force-quit drain counter; upon expiration of the force-quit drain counter, transitioning the associated processing unit from the force-quit drain state to a force-quit done state; and while in the force-quit done state: asserting the force-quit done signal to the interconnect topology in response to an input port from the interconnect topology being asserted.

Clause 48. The processing system of clause 45, wherein the interconnect topology comprises a daisy chain.

Clause 49. The processing system of clause 45, each processing unit in the array of processing units having a FORCE_QUIT_DONE_IN input and a FORCE_QUIT_DONE_OUT output, the FORCE_QUIT_DONE_OUT output asserted only while both FORCE_QUIT_DONE_IN and the force-quit done signal indicating the reset of the processing unit are asserted.

Clause 50. A reconfigurable processor, comprising: an array of configurable units on an integrated circuit substrate, the array including one or more sub-arrays of configurable units; an interconnect topology for force-quit done signals generated by the configurable units in a sub-array of the one or more sub-arrays of configurable units; a force-quit controller coupled to the configurable units in the sub-array of the one or more sub-arrays of configurable units and to the interconnect topology; configurable units in the sub-array of configurable units respectively including force-quit logic configurable to: receive a force-quit command from the force-quit controller, reset its respective configurable unit in response to the force-quit command, and generate a force-quit done signal to indicate completion of the reset of the respective configurable unit, and provide the force-quit done signal to the interconnect topology; and the interconnect topology configured to report force-quit completion to the force-quit controller in response to each configurable unit in the sub-array of configurable units generating its force-quit done signal.

Clause 51. The reconfigurable processor of clause 50, further comprising: an interface agent coupled to a host processor executing runtime software via an interface link; and a force-quit detector coupled to the interface agent and to respective force-quit controllers of the one or more sub-arrays of configurable units and configured to receive a force-quit initiation from the runtime software through the interface agent and to provide a force-quit strobe to one or more of the respective force-quit controllers over dedicated connections between the respective force-quit controllers and the force-quit detector.

Clause 52. The reconfigurable processor of clause 50, further comprising an interface agent coupled to a host processor executing runtime software via an interface link; the force-quit controller configurable to send in interrupt to the host processor in response to receiving the report of the force-quit completion from the interconnect topology.

Clause 53. The reconfigurable processor of clause 50, the sub-array of configurable units including a master configurable unit that includes the force-quit controller and U other configurable units, the master configurable unit and each of the N other configurable units in the sub-array of configurable units having a FORCE_QUIT_DONE_IN and a FORCE_QUIT_DONE_OUT; the interconnect topology comprising: logic in each of the other configurable units in the sub-array of configurable units that asserts its respective FORCE_QUIT_DONE_OUT in response to both the other configurable unit's respective FORCE_QUIT_DONE_IN and respective force-quit done signal being asserted; a connection from the FORCE_QUIT_DONE_OUT of the master configurable unit to other configurable unit 1 of the N other configurable units; a daisy chain connection between a respective FORCE_QUIT_DONE_OUT of other configurable unit N−1 to a respective FORCE_QUIT_DONE_IN of other configurable unit N, where $2 \leq N \leq U$; and a connection from the FORCE_QUIT_DONE_OUT of other configurable unit U to the FORCE_QUIT_DONE_IN of the master configurable unit.

Clause Set 2

Clause 1. A reconfigurable data processor, comprising: an array of configurable units, the array including a plurality of sub-arrays of configurable units, and sub-arrays of configurable units in the plurality of sub-arrays of configurable units configurable to separately execute different programs; and a force-quit controller connected to the array, configurable to stop execution of a particular program on a particular sub-array of configurable units in the plurality of sub-arrays of configurable units and reset the particular sub-array of configurable units, while remaining sub-arrays of configurable units in the plurality of sub-arrays of configurable units continue execution of remaining programs.

Clause 2. The reconfigurable data processor of clause 1, wherein the force-quit controller is further configurable to respond to a force-quit command to stop the execution of the particular program on the particular sub-array of configurable units and reset the particular sub-array of configurable units.

Clause 3. The reconfigurable data processor of clause 2, wherein the force-quit command is generated in response to an external event outside the array.

Clause 4. The reconfigurable data processor of clause 3, wherein the force-quit command is generated by a runtime program running on a host processor connected to the array.

Clause 5. The reconfigurable data processor of clause 2, wherein the force-quit command is generated in response to an internal event inside the array.

Clause 6. The reconfigurable data processor of clause 5, wherein the force-quit command is generated by a program executing in the array.

Clause 7. The reconfigurable data processor of clause 2, wherein the force-quit command is generated in response to the particular sub-array of configurable units becoming unresponsive.

Clause 8. The reconfigurable data processor of clause 7, wherein the particular sub-array of configurable units becomes unresponsive due to a hardware bug.

Clause 9. The reconfigurable data processor of clause 7, wherein the particular sub-array of configurable units becomes unresponsive due to a software bug.

Clause 10. The reconfigurable data processor of clause 1, wherein the force-quit controller is further configurable to make the particular sub-array of configurable units available to execute a new program.

Clause 11. The reconfigurable data processor of clause 10, wherein the force-quit controller is further configurable to make the particular sub-array of configurable units available to receive new commands from a runtime program.

Clause 12. The reconfigurable data processor of clause 1, wherein each sub-array of configurable units in the plurality of sub-arrays of configurable units has a plurality of address generation and coalescing units (AGCUs), including a master AGCU.

Clause 13. The reconfigurable data processor of clause 12, wherein a particular master AGCU of the particular sub-array of configurable units includes the force-quit controller.

Clause 14. The reconfigurable data processor of clause 13, wherein respective sub-arrays in the plurality of sub-arrays of configurable units have respective master AGCUs that include respective force-quit controllers.

Clause 15. The reconfigurable data processor of clause 1, wherein the force-quit controller is further configurable to cause configurable units in a particular sub-array of configurable units to clear their internal states.

Clause 16. The reconfigurable data processor of clause 1, wherein the force-quit controller is further configurable to cause the configurable units to restore their credit counters.

Clause 17. The reconfigurable data processor of clause 1, wherein the force-quit controller is further configurable to cause the configurable units to empty their input buffers and output buffers.

Clause 18. The reconfigurable data processor of clause 13, wherein the force-quit controller is further configurable to cause the particular master AGCU to complete outstanding transactions on communication resources (top level network (TLN)) configurable to set up links between a configurable interconnect (array level network (ALN)) of the array and external data processing resources outside the array.

Clause 19. The reconfigurable data processor of clause 13, wherein the force-quit controller is further configurable to cause the particular master AGCU to empty its input buffers and output buffers.

Clause 20. A computer-implemented method comprising: loading and executing a first program on a first sub-array of configurable units of a plurality of sub-arrays of configurable units on a reconfigurable data processor; loading and executing a second program on a second sub-array of configurable units of the plurality of sub-arrays of configurable units on the reconfigurable data processor; receiving a force-quit initiation from a runtime program at an interface agent of the reconfigurable data processor, the force-quit initiation indicating that a force-quit process should be initiated on the first sub-array of configurable units without impacting the execution of the second program on the second sub-array of configurable units; sending a force-quit signal from the interface agent to a force-quit controller for the first sub-array; and resetting configurable units in the first sub-array of configurable units in response to the force-quit signal which stops the execution of the first program while the execution of the second program on the second sub-array of configurable units continues.

Additional Considerations

We describe various implementations of a reconfigurable processor that support force-quit.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dice in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more RDUs to execute a high-level program. Furthermore, one or more implementations of the technology or elements thereof can be implemented in the form of an apparatus including a memory and at least one processor that is coupled to the memory and operative to perform exemplary method steps, and/or an RDU that is operative to execute a high-level program based on a configuration file. Yet further, in another aspect, one or more implementations of the technology or elements thereof can be implemented in the form of means for executing one or more of the method steps described herein and/or executing a high-level program described herein. Such means can include (i) hardware module(s); (ii) software module(s) executing on one or more hardware processors; (iii) bit files for configuration of an array of configurable units; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope of the technology disclosed.

What is claimed is:

1. A method to reset configurable units in a reconfigurable processor having an array of configurable units and a force-quit controller on an integrated circuit substrate, the array including a plurality of sub-arrays of configurable units, the method comprising:

receiving a force-quit command at the force-quit controller, and generating force-quit control signals that reset configurable units in a particular sub-array of the plurality of sub-arrays of configurable units;

wherein the particular sub-array includes the force-quit controller.

2. The method of claim 1, further comprising sending the force-quit command to the force-quit controller from an interface agent included in the reconfigurable processor, wherein the interface agent communicates data between the array and an interface bus over a top level network, and wherein the interface bus is connected to a host processor via an interface link.

3. The method of claim 2, further comprising completing, by the particular sub-array, outstanding transactions on the top level network in response to receiving the force-quit control signals from the force-quit controller.

4. The method of claim 2, further comprising:

receiving, at the interface agent from a runtime program running on a host processor, a force-quit message written to a register in an address space of the interface bus by a runtime program running on a host processor; and sending the force-quit command to the force-quit controller in response to receiving the force-quit message.

5. The method of claim 4, wherein the register is located in a configuration address space of the interface bus.

6. The method of claim 4, further comprising:

receiving a sequence of writes to the register; and recognizing the sequence of writes to the register as the force-quit message.

7. The method of claim 6, wherein the sequence of writes to the register includes:

a first set of one or more writes to the register to represent a function header;

a second set of one or more writes to the register to represent a function select; and a third set of one or more writes to the register to represent a sub-array-specific function argument.

8. The method of claim 7, wherein the sub-array-specific function argument makes the force-quit message specific to the particular sub-array.

9. The method of claim 6, further comprising sending the force-quit command as a strobe signal in response to recognizing the sequence of writes to the register as the force-quit message.

10. The method of claim 9, further comprising sending the force-quit command from the interface agent to the force-quit controller via a global wire.

11. The method of claim 4, wherein the force-quit message includes a mask having one bit respectively associated with each sub-array in the plurality of sub-arrays and each sub-array has a respective force-quit controller, the method further comprising:

for each bit in the mask that is set, sending a respective force-quit command to the respective force-quit controller of the sub-array associated with the set bit.

12. The method of claim 1, further comprising broadcasting the force-quit control signals from the force-quit controller to the configurable units in the particular sub-array over an array level network connected to the configurable units in the particular sub-array.

13. The method of claim 1, further comprising resetting an internal state of the configurable units in the particular sub-array in response to receiving the force-quit control signals.

14. The method of claim 1, further comprising emptying input buffers and output buffers of the configurable units in the particular sub-array in response to receiving the force-quit control signals.

15. The method of claim 1, wherein the particular sub-array is unresponsive while executing a current program, and the force-quit control signals cause the configurable units in the particular sub-array to be available for execution of a next program.

16. The method of claim 1, the particular sub-array of configurable units including a plurality of force-quit logic circuits associated with respective configurable units of the particular sub-array of configurable units and connected in an interconnect topology, the method further comprising:

receiving a particular force-quit control signal of the force-quit control signals at a particular force-quit logic circuit of the plurality of force-quit logic circuits;

resetting the respective configurable unit associated with the particular force-quit logic circuit in response to the particular force-quit control signal;

generating a particular force-quit done signal to indicate completion of the reset of the respective configurable unit associated with the particular force-quit logic circuit, receiving a preceding force-quit done signal is a preceding force-quit logic circuit on the interconnect topology; and forwarding the particular force-quit done signal on the interconnect topology in response to receiving the preceding force-quit done signal.

17. The method of claim 16, further comprising:

broadcasting the force-quit control signals from the force-quit controller to the configurable units of the particular sub-array of configurable units; and receiving a force-quit done signal from a last force-quit logic circuit on the interconnect topology.

18. The method of claim 16, further comprising:

transitioning the respective configurable unit associated with the particular force-quit logic circuit from a current state to a force-quit drain state in response to the particular force-quit control signal;

while in the force-quit drain state, de-asserting the particular force-quit done signal to the interconnect topology, and starting a force-quit drain counter;

upon expiration of the force-quit drain counter, transitioning the respective configurable unit associated with the particular force-quit logic circuit from the force-quit drain state to a force-quit done state; and while in the force-quit done state, asserting the particular force-quit done signal to the interconnect topology in response to an input port from the interconnect topology being asserted.

19. The method of claim 16, wherein the interconnect topology comprises a daisy chain.

20. The method of claim 16, each configurable unit in the particular sub-array of configurable units having a FORCE_QUIT_DONE_IN input and a FORCE_QUIT_DONE_OUT output, the FORCE_QUIT_DONE_OUT output asserted only while both FORCE_QUIT_DONE_IN and a signal indicating that the respective configurable unit are asserted.

\* \* \* \* \*